(12) United States Patent
Sakakibara

(10) Patent No.: US 8,462,243 B2
(45) Date of Patent: Jun. 11, 2013

(54) SOLID-STATE IMAGE SENSING DEVICE, METHOD FOR READING SIGNAL OF SOLID-STATE IMAGE SENSING DEVICE, AND IMAGE PICKUP APPARATUS

(75) Inventor: Masaki Sakakibara, Kanagawa (JP)

(73) Assignee: Sony Corporation (JP)

(*) Notice: Subject to any disclaimer, the term of this patent is extended or adjusted under 35 U.S.C. 154(b) by 0 days.

(21) Appl. No.: 13/467,338

(22) Filed: May 9, 2012

(65) Prior Publication Data

US 2012/0217380 A1 Aug. 30, 2012

Related U.S. Application Data

(63) Continuation of application No. 12/355,271, filed on Jan. 16, 2009, now Pat. No. 8,218,049.

(30) Foreign Application Priority Data

Jan. 29, 2008 (JP) ................................ 2008-017120

(51) Int. Cl.
*H04N 3/14* (2006.01)
*H04N 5/335* (2011.01)

(52) U.S. Cl.
USPC ............................ 348/302; 348/300; 348/294

(58) Field of Classification Search
USPC .................. 359/272, 281, 294, 300, 302, 308
See application file for complete search history.

(56) References Cited

U.S. PATENT DOCUMENTS

2005/0259167 A1* 11/2005 Inoue et al. ................... 348/300
2009/0009645 A1 1/2009 Schrey et al.

FOREIGN PATENT DOCUMENTS

| JP | 02-078382 | 3/1990 |
| JP | 2000-078474 | 3/2000 |
| JP | 2002-320146 | 10/2002 |
| JP | 2003-511920 | 3/2003 |
| JP | 2005-093549 | 4/2005 |
| JP | 2005-269471 | 9/2005 |
| JP | 2006-020173 | 1/2006 |
| JP | 2005-136540 | 5/2006 |
| JP | 2007-067484 | 3/2007 |

* cited by examiner

*Primary Examiner* — William Choi
(74) *Attorney, Agent, or Firm* — Sheridan Ross P.C.

(57) ABSTRACT

An image sensor including a pixel array having vertical signal lines, each interconnected to one of columns of the pixel array, and a column processor including a unit readout circuit provided for each of sets of a predetermined number of columns. The unit readout circuit includes input switches, each connected to a corresponding one of the vertical signal lines and being sequentially turned on and off, an input capacitor having one end commonly connected to the input switches, a reference switch for selectively providing a reference voltage to the input capacitor, an operational amplifier connected to the other end of the input capacitor, a reset switch for selectively providing a short-circuit between input and output ends of the operational amplifier, and a feedback circuit provided for each of the columns and including a feedback switch and a feedback capacitor connected in series between the two ends of the operational amplifier.

8 Claims, 19 Drawing Sheets

SOLID-STATE IMAGE SENSING DEVICE, METHOD FOR READING SIGNAL OF SOLID-STATE IMAGE SENSING DEVICE, AND IMAGE PICKUP APPARATUS

RELATED APPLICATION DATA

This application is a continuation of U.S. patent application Ser. No. 12/355,271, filed Jan. 16, 2009, the entirety of which is incorporated herein by reference to the extent permitted by law. This application claims the benefit of priority to Japanese Patent Application No. JP 2008-017120 filed in the Japanese Patent Office on Jan. 29, 2008, the entirely of which is incorporated herein by reference to the extent permitted by law.

BACKGROUND OF THE INVENTION

1. Field of the Invention

The present invention relates to a solid-state image sensing device, a method for reading out a signal of a solid-state image sensing device, and an image pickup apparatus and, in particular, to a solid-state image sensing device for reading out a signal output from each of the columns of an array of unit pixels while amplifying the signal using a signal readout circuit unit, a method for reading out a signal for use in the solid-state image sensing device, and an image pickup apparatus using the solid-state image sensing device.

2. Description of the Related Art

It is difficult to reduce the area of a circuit portion of solid-state image sensing device, such as complementary metal oxide semiconductor (CMOS) image sensors, and reduce noise occurring in the circuit portion at the same time. Existing CMOS image sensors include a signal readout circuit unit (a column processing unit) provided for each column of a pixel array of a pixel array unit. In a related art, in order to reduce noise of CMOS image sensors, the signal readout circuit unit amplifies a signal having a narrow noise bandwidth by performing computation using a switched capacitor circuit and a capacitance ratio. Thereafter, the signal readout circuit unit reduces the noise by computing the equivalent input power of the amplified signal (refer to, for example, Japanese Unexamined Patent Application Publication No. 2005-269471).

As shown in FIG. 20, in existing CMOS image sensors, the signal readout circuit unit includes unit readout circuits (signal readout circuit units) 100 (100-1 to 100-n), each including an operational amplifier 101, control switches 102, 103, and 104, an input side capacitor 105, and a feedback capacitor 106. One of the signal readout circuit units 100 is provided to a corresponding one of n columns of the pixel array of a pixel array unit. Signals Vin[1] to Vin[n] output from the columns (the unit pixels in the columns) are amplified by the unit readout circuits 100-1 to 100-n and are read out.

SUMMARY OF THE INVENTION

In existing CMOS image sensors including the n parallel signal readout circuit units (the column processing units) 100, n circuit component devices, such as n operational amplifiers 101, n input side capacitors 105, and n feedback capacitors 106, are necessary. Since these circuit component devices occupy almost all of the area of the integrated circuit, the signal readout circuit units 100 occupy a large area. Therefore, it is difficult to reduce the chip sizes of the CMOS image sensors.

Accordingly, the present invention provides a solid-state image sensing device including a signal readout circuit unit that amplifies and reads out a signal output from each of the columns of an array of unit pixels and that minimizes the area occupied thereby, a method for reading out a signal for use in the solid-state image sensing device, and an image pickup apparatus using the solid-state image sensing device.

According to an embodiment of the present invention, a solid-state image sensing device includes a pixel array unit and a column processing unit. The pixel array unit includes unit pixels, each including a photoelectric conversion unit, arranged in an array, and vertical signal lines, each interconnected to one of columns of the pixel array. The column processing unit includes a unit readout circuit provided for each of sets of a predetermined number of columns of the columns of the pixel array, where the column processing unit processes a reset signal generated through a pixel reset operation and a received-light photoelectric conversion signal generated through a photoelectric conversion operation and output from the unit pixel to the vertical signal lines. The unit readout circuit includes a plurality of input switches, where an input end of each of the input switches is connected to one end of the corresponding one of the vertical signal lines, and the input switches are sequentially turned on and off; at least one input side capacitor having one end commonly connected to an output end of each of the input switches; a reference switch configured to selectively provide a reference voltage to the input side capacitor; an operational amplifier having an input end connected to the other end of the input side capacitor; a reset switch configured to selectively make a short-circuit between the input end and an output end of the operational amplifier; and a feedback circuit provided for each of the columns of the pixel array, where the feedback circuit includes a feedback switch and a feedback capacitor connected in series between the input end and the output end of the operational amplifier.

The unit readout circuit is provided for each of sets of a predetermined number of columns of the columns of the pixel array. A plurality of feedback circuits, each including a feedback switch and a feedback capacitor, are provided for a plurality of columns of the pixel array. However, according to the embodiment, some sub-circuits of the unit readout circuit, more specifically, the input side capacitor, the reference switch, the operational amplifier, and the reset switch, are shared by the plurality of columns of the pixel array. Such a configuration can reduce the circuit area occupied by the column processing unit, as compared with the configuration in which a plurality of input side capacitors, reference switches, and operational amplifiers are provided for a plurality of columns of the pixel array.

According to another embodiment of the present invention, a signal readout method for use in a solid-state image sensing device having the above-described configuration is provided. The method includes the steps of transferring one of a difference between the reset signal and the reference voltage and a difference between the received-light photoelectric conversion signal and the reference voltage to the feedback capacitor via the input side capacitor by alternately turning on one of the plurality of input switches and the reference switch and reading out a difference between the received-light photoelectric conversion signal and the reset signal for each of the columns of the pixel array by alternately turning on one of the plurality of input switches and the reference switch so as to transfer one of the difference between the reset signal and the reference voltage and the difference between the received-light photoelectric conversion signal and the reference voltage to the feedback capacitor via the input side capacitor.

In the solid-state image sensing device that reads signals output from the unit pixels using the unit readout circuit provided for each of sets of a predetermined number of columns of the columns of the pixel array, a plurality of feedback switches each including a feedback switch and a feedback capacitor are provided for a plurality of columns of the pixel array. However, the input side capacitor, the reference switch, the operational amplifier, and the reset switch are shared by the plurality of columns of the pixel array. Even when these components are shared by the plurality of columns, the difference between the received-light photoelectric conversion signal and the reset signal can be read out for each of the plurality of columns through the above-described signal readout processing procedure. Thus, a correlated double sampling signal process can be performed so that pixel-specific fixed pattern noise is removed.

According to still another embodiment of the present invention, an image pickup apparatus is provided. In the image pickup apparatus, a solid-state image sensing device having the above-described configuration is used for an image sensing device (an image pickup device) that receives image light from a subject and converts the image light into an electrical signal.

Such a configuration of the solid-state image sensing device can reduce the circuit area occupied by the column processing unit. Accordingly, the chip size of the solid-state image sensing device can be reduced. As a result, the size of the body of the image pickup apparatus can be reduced by employing the above-described solid-state image sensing device.

As noted above, in the above-described solid-state image sensing device, the unit readout circuit is provided for each of sets of a predetermined number of columns of the columns of the pixel array, and some sub-circuits of the unit readout circuit are shared by a plurality of columns of the pixel array. Since such a configuration can reduce the circuit area occupied by the column processing unit, the chip size of the solid-state image sensing device can be reduced.

According to the signal readout method of the above-described embodiment for use in a solid-state image sensing device, even when some sub-circuits of the unit readout circuit are shared by a plurality of columns of the pixel array, a correlated double sampling signal process can be performed by reading out the difference between the received-light photoelectric conversion signal and the reset signal for each of the plurality of columns. Thus, pixel-specific fixed pattern noise can be removed in the solid-state image sensing device having a reduced chip size.

According to the image pickup apparatus of the above-described embodiment, the size of the body of the image pickup apparatus can be reduced by using a solid-state image sensing device having a reduced circuit area occupied by a column processing circuit and a reduced chip size of the solid-state image sensing device, where the circuit area occupied by a column processing circuit is reduced by sharing some sub-circuits of the unit readout circuit for a plurality of columns of the pixel array.

DESCRIPTION OF THE PREFERRED EMBODIMENTS

Various exemplary embodiments of the present invention are described in detail below with reference to the accompanying drawings.

Figure 1:
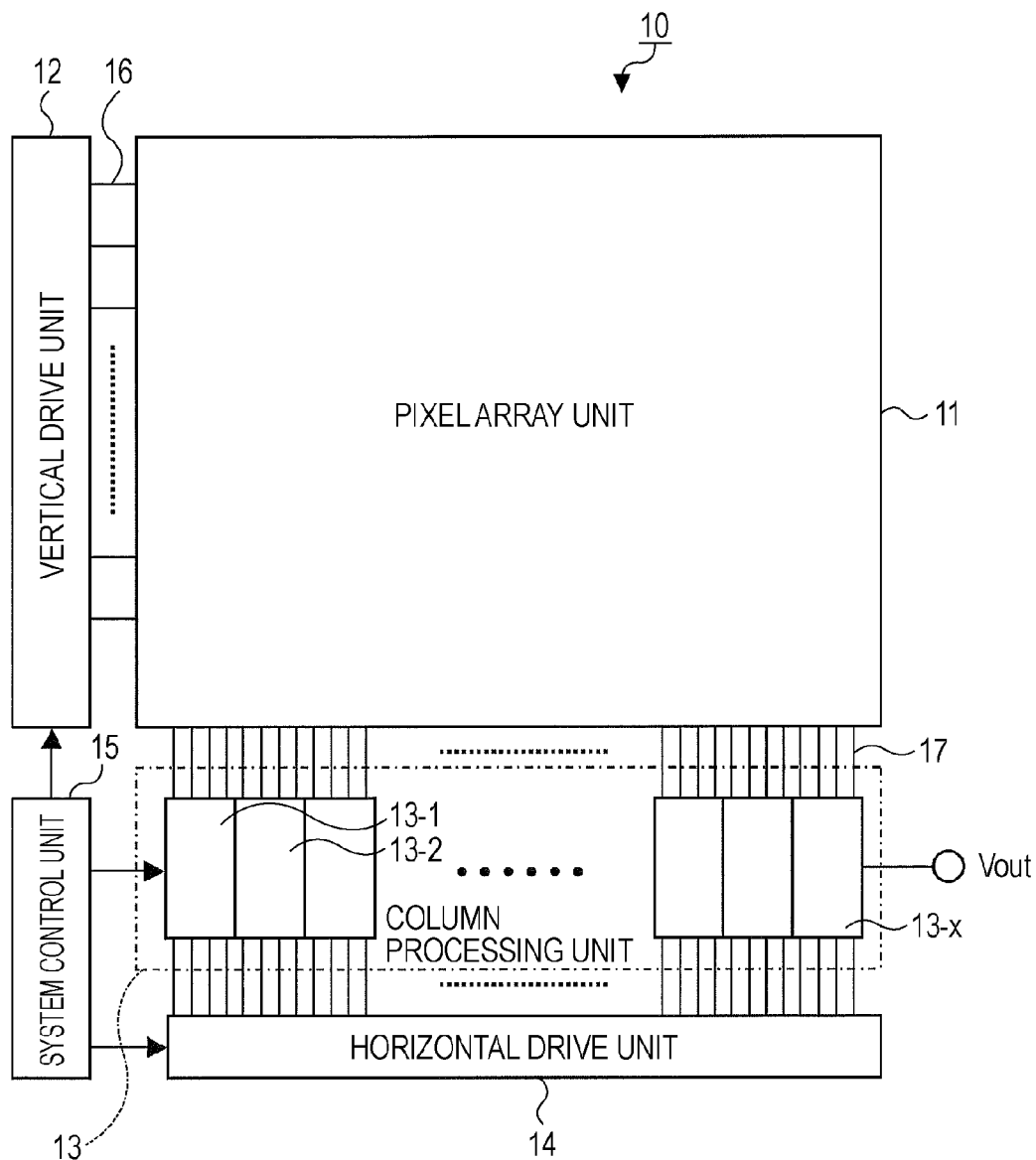
FIG. 1 is a schematic illustration of an exemplary system configuration of a CMOS image sensor according to an embodiment of the present invention.

FIG. 1 illustrates an exemplary system configuration of a solid-state image sensing device, such as a CMOS image sensor, according to an embodiment of the present invention.

As shown in FIG. 1, according to the present exemplary embodiment, a CMOS image sensor 10 includes a pixel array unit 11 formed on a semiconductor substrate (a chip) (not shown) and a peripheral circuit unit integrated on the semiconductor substrate. The peripheral circuit unit includes a vertical drive unit 12, a column processing unit 13, and a horizontal drive unit 14, and a system control unit 15.

The pixel array unit 11 includes unit pixels (hereinafter sometimes simply referred to as "pixels") (not shown) arranged in a two-dimensional array. Each of the unit pixels includes a photoelectric conversion unit that converts incident visible light to electrical charge in accordance with the intensity of the visible light. An exemplary structure of the pixel unit is described in more detail below.

The pixel array unit 11 further includes a pixel driving line 16 extending in the horizontal direction (the row direction of the pixel array) of FIG. 1 for each of the rows of the pixel array. The pixel array unit 11 still further includes a vertical signal line 17 extending in the vertical direction (the column direction of the pixel array) of FIG. 1 for each of the columns of the pixel array. While only one pixel driving line 16 is shown in FIG. 1, the number of the pixel driving lines 16 is not limited to one. One end of the pixel driving line 16 is connected to a corresponding one of output terminals of the vertical drive unit 12, where one of the output terminals corresponds to one of the rows of the pixel array.

The vertical drive unit 12 includes a shift register and an address decoder. The detailed configuration is not shown in FIG. 1. However, in general, the vertical drive unit 12 includes a readout scanning sub-unit and a sweep scanning sub-unit. The scanning sub-unit sequentially selects and scans the unit pixels so as to read out the signals from the unit pixels on a row-by-row basis. The sweep scanning sub-unit sweeps (resets) unnecessary electrical charge from photoelectric conversion units of the unit pixels in the readout row at a shutter time before the readout scanning sub-unit performs the readout operation on the unit pixels in that row.

This sweep (reset) operation performed by the sweep sub-unit provides a so-called electronic shutter operation. As used herein, the term "electronic shutter operation" refers to an operation in which light charge in each of the photoelectric conversion units is discharged so that a new exposure operation (an operation that accumulates light charge) is started.

The readout signal obtained through a readout operation performed by the readout scanning sub-unit corresponds to the amount of light incident after the immediately previous readout operation or electronic shutter operation is completed. A time period from when the immediately previous readout operation or sweep operation of the electronic shutter operation is completed to when the current readout operation is completed corresponds to an accumulation time (an exposure time) of light charge accumulated in the unit pixels.

Signals output from the unit pixels in a row selected and scanned by the vertical drive unit 12 are supplied to the column processing unit 13 via the vertical signal lines 17. The column processing unit 13 functions as a signal readout circuit unit that reads out, on a column-by-column basis, the signals output from pixels 20 in a selected row of the pixel array unit 11 while amplifying the signals.

According to the present exemplary embodiment, the pixel array unit 11 has n columns of pixels (i.e., the number of pixels in the horizontal direction is n). The n columns are grouped into a plurality of sets of m columns (m is an integer fraction of n, and m may be n). The column processing unit (the signal readout circuit unit) 13 includes x unit readout circuits 13-1 to 13-x each provided for one of the sets of m columns. More specifically, for example, each of the unit readout circuits 13-1 to 13-x may be provided for every 4 columns, every 16 columns, or every 32 columns.

Each of the unit readout circuits 13-1 to 13-x amplifies signals output from the pixels 20 of the corresponding set of m columns in the selected row in a time multiplexed manner and performs a signal process, such as a correlated double sampling (CDS) process, on the signals so as to remove pixel-specific fixed pattern noise. The circuit configuration and operation of the unit readout circuits 13-1 to 13-x are described in more detail below.

The horizontal drive unit 14 includes a shift register and an address decoder. The horizontal drive unit 14 sequentially selects the unit readout circuits 13-1 to 13-x of the column processing unit 13. Through the selecting and scanning operation performed by the horizontal drive unit 14, signals processed by the unit readout circuits 13-1 to 13-x are sequentially output on a pixel-by-pixel basis.

The system control unit 15 includes a timing generator that generates a variety of timing signals. The system control unit 15 drives the vertical drive unit 12, the column processing unit 13, and the horizontal drive unit 14 on the basis of the timing signals generated by the timing generator.

Circuit Configuration of Unit Pixel

Figure 2:
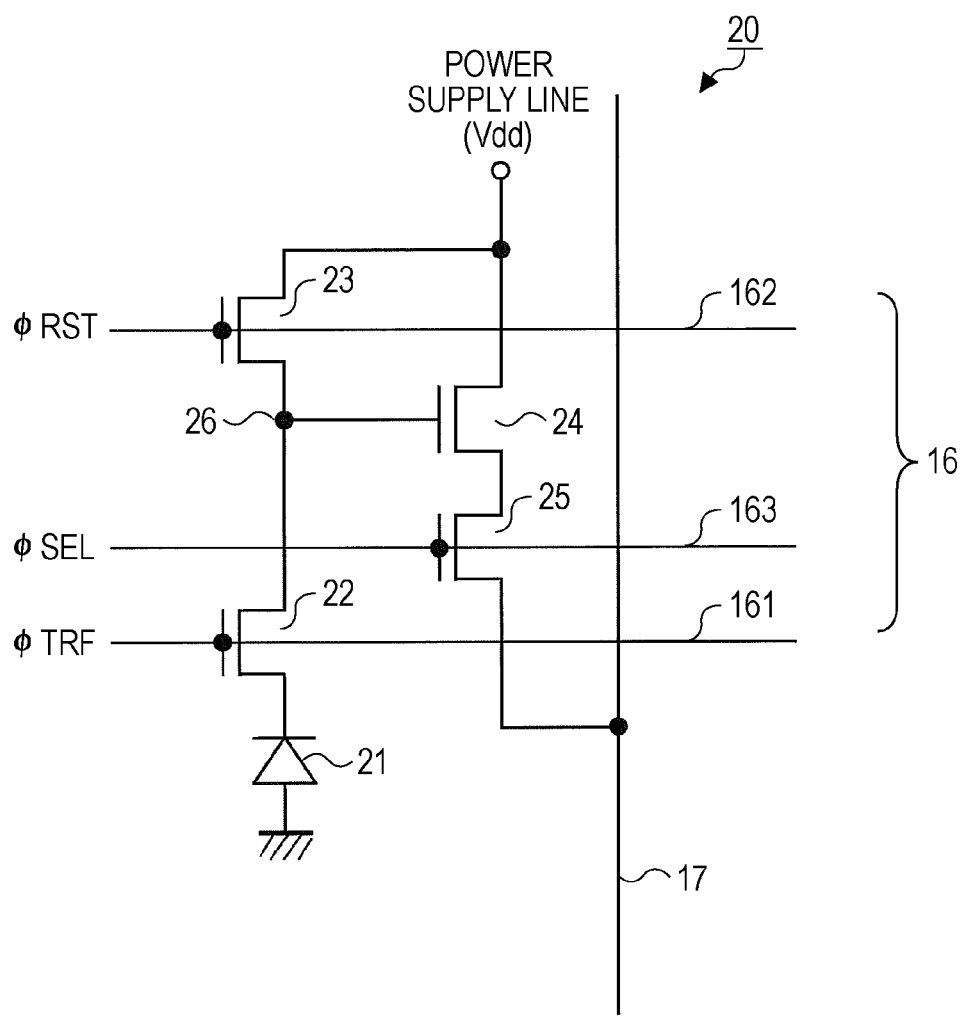
FIG. 2 is a circuit diagram illustrating an exemplary circuit configuration of a unit pixel.

FIG. 2 is a circuit diagram illustrating an exemplary circuit configuration of the unit pixel 20. As shown in FIG. 2, the unit pixel 20 having this exemplary circuit configuration includes a photoelectric conversion unit, such as a photodiode 21. In addition, the unit pixel 20 includes the following four transistors: a transfer transistor 22, a reset transistor 23, an amplifying transistor 24, and a selection transistor 25.

In the present exemplary embodiment, for example, an N-channel MOS transistor is used for each of the transistors 22 to 25. However, the combination of the conductivity types of the transfer transistor 22, the reset transistor 23, the amplifying transistor 24, and the selection transistor 25 is not limited thereto. A combination of the conductivity types of the transistors can be appropriately determined.

The pixel driving line 16 for the unit pixel 20 includes, for example, the following three lines: a transfer line 161, a reset line 162, and a selection line 163. The pixel driving line 16 is commonly provided for all of the unit pixels 20 in the same row of the pixel array. One end of the transfer line 161, one end of the reset line 162, and one end of the selection line 163 are connected to output ends of the vertical drive unit 12 corresponding to the rows on a row-by-row basis.

The anode of the photodiode 21 is connected to a negative power supply (e.g., the ground). The photodiode 21 photoelectrically converts the received light to light charge (photoelectrons in the present exemplary embodiment) having an amount in accordance with the intensity of the received light. The cathode electrode of the photodiode 21 is electrically connected to a gate electrode of the amplifying transistor 24 via the transfer transistor 22. A node 26 electrically connected to the gate electrode of the amplifying transistor 24 is referred to as a "floating diffusion (FD) unit".

The transfer transistor 22 is connected between the cathode electrode of the photodiode 21 and the FD unit 26. When a transfer pulse φTRF having an active high level (e.g., a Vdd level) (hereinafter referred to as a "high active transfer pulse") is supplied to a gate electrode of the transfer transistor 22 via the transfer line 161, the transfer transistor 22 is turned on. Thus, the transfer transistor 22 transfers the light charge photoelectrically converted by the photodiode 21 to the FD unit 26.

A drain electrode of the reset transistor 23 is connected to a pixel power supply Vdd. The source electrode of the reset transistor 23 is connected to the FD unit 26. When a high active reset pulse φRST is supplied to a gate electrode of the reset transistor 23 via the reset line 162, the reset transistor 23 is turned on. Thus, the reset transistor 23 resets the FD unit 26 by discharging the electrical charge of the FD unit 26 to the pixel power supply Vdd before signal charge is transferred from the photodiode 21 to the FD unit 26.

The gate electrode of the amplifying transistor 24 is connected to the FD unit 26. A drain electrode of the amplifying transistor 24 is connected to the pixel power supply Vdd. After the FD unit 26 is reset by the reset transistor 23, the amplifying transistor 24 outputs the potential of the FD unit 26 in the form of a reset signal (a reset level) Vreset. In addition, after the signal charge is transferred by the transfer transistor 22, the amplifying transistor 24 outputs the potential of the FD unit 26 in the form of a received-light photoelectric conversion signal (a signal level) Vsig.

For example, a drain electrode of the selection transistor 25 is connected to the source of the amplifying transistor 24. The source electrode of the selection transistor 25 is connected to the vertical signal line 17. When a high active selection pulse φSEL is supplied to the gate of the selection transistor 25 via the selection line 163, the selection transistor 25 is turned on. Thus, the selection transistor 25 causes the unit pixel 20 to enter a selected mode so that a signal output from the amplifying transistor 24 is relayed to the vertical signal line 17.

Note that a circuit configuration in which the selection transistor 25 is connected between the pixel power supply Vdd and the drain of the amplifying transistor 24 may be employed.

It should be noted that the pixel structure of the unit pixel 20 is not limited to the above-described four-transistor pixel structure. For example, the unit pixel 20 may have a three-transistor pixel structure in which the functions of the amplifying transistor 24 and the selection transistor 25 are performed by one transistor. Thus, any configuration of a pixel circuit can be employed.

Circuit Configuration of Unit Readout Circuit

An exemplary circuit configuration of each of the unit readout circuits 13-1 to 13-$x$ of the column processing unit (the signal readout circuit unit) 13 is described next. The present exemplary embodiment is characterized by the unit readout circuits 13-1 to 13-$x$.

Figure 3:
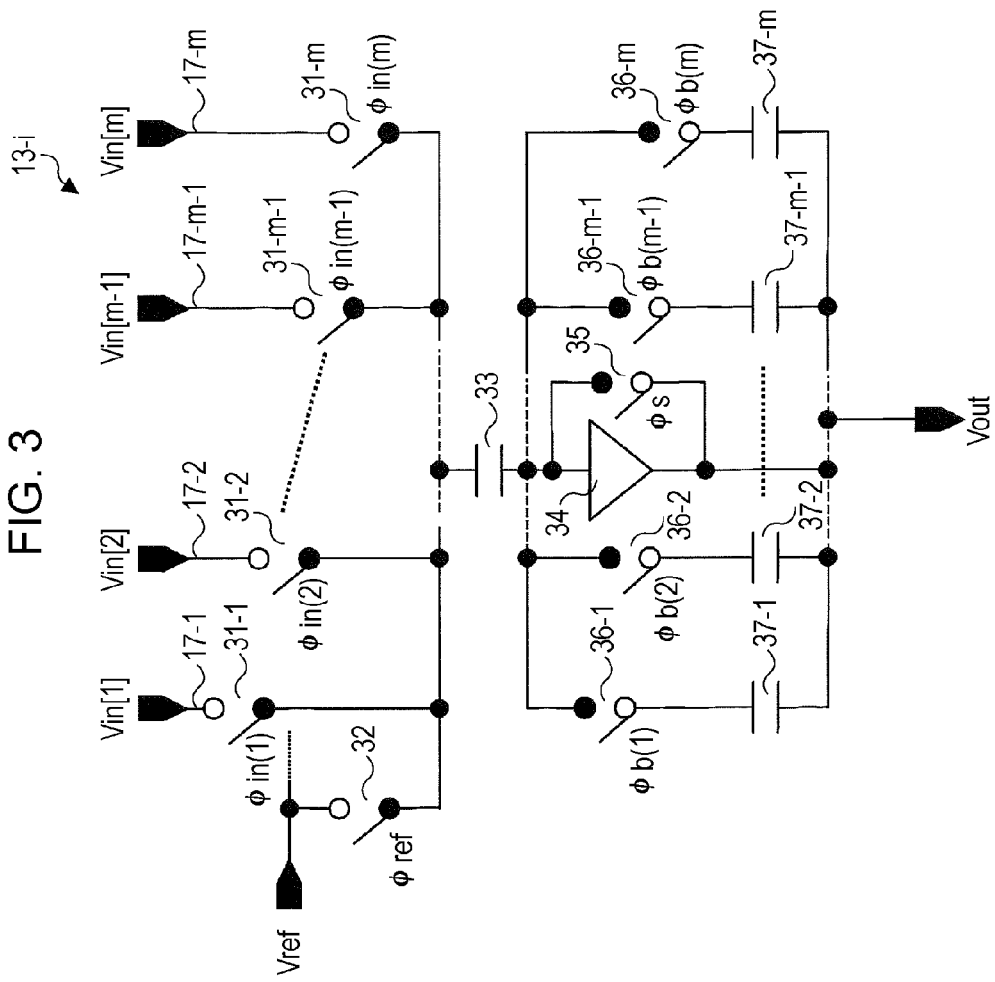
FIG. 3 is a circuit diagram illustrating an exemplary circuit configuration of a unit readout circuit.

FIG. 3 is a circuit diagram illustrating an exemplary circuit configuration of each of the unit readout circuits 13-1 to 13-$x$. The following description is made with reference to the unit readout circuit 13-$i$, which is a unit readout circuit for an i-th column among the unit readout circuits 13-1 to 13-$x$ (i=1, 2, ..., x). However, each of the other unit readout circuits has a similar circuit configuration. In addition, each of the unit readout circuits 13-1 to 13-$x$ is provided for every m vertical signal lines 17 (17-1 to 17-$m$).

The unit readout circuit 13-$i$ includes m input switches 31-1 to 31-$m$ corresponding to the m vertical signal lines 17-1 to 17-$m$, respectively, a reference switch 32, an input side capacitor 33, an operational amplifier 34, a reset switch 35, m feedback switches 36-1 to 36-$m$, and m feedback capacitors 37-1 to 37-$m$.

An input end of each of the input switches 31-1 to 31-$m$ is connected to an output end of the corresponding one of the vertical signal lines 17-1 to 17-$m$. Signals output from the unit pixels 20 in a selected raw are sequentially sampled through the vertical signal lines 17-1 to 17-$m$ in synchronization with switch control signals φin(1) to φin(m). The reference switch 32 samples a reference voltage Vref applied to all of the unit readout circuits 13-1 to 13-$x$ in synchronization with a switch control signal φref.

Output ends of the input switches 31-1 to 31-$m$ and an output end of the reference switch 32 are connected together. One end of the input side capacitor 33 is connected to a common connection node of the output ends of the input switches 31-1 to 31-$m$ and the reference switch 32. One end of the operational amplifier 34 is connected to the other end of the input side capacitor 33. The reset switch 35 is connected between an input end and an output end of the operational amplifier 34. The reset switch 35 selectively causes a short circuit between the output end and the input end of the operational amplifier 34 in synchronization with a switch control signal φs.

One end of each of the feedback switches 36-1 to 36-$m$ and an input end of the operational amplifier 34 are connected together. One end of each of the feedback capacitors 37-1 to 37-$m$ is connected to the other end of the corresponding one of the feedback switches 36-1 to 36-$m$. The other end of each of the feedback capacitors 37-1 to 37-$m$ and the output end of the operational amplifier 34 are connected together. That is, the feedback switches 36-1 to 36-$m$ are connected in series to the feedback capacitors 37-1 to 37-$m$, respectively, between the input end and the output end of the operational amplifier 34. In this way, a feedback circuit is formed.

The feedback switches 36-1 to 36-$m$ are turned on (into a closed state) in synchronization with switch control signals φb(1) to φb(m) so as to selectively insert a series connection circuit formed by the feedback switches 36-1 to 36-$m$ and the feedback capacitors 37-1 to 37-$m$, respectively, between the input end and the output end of the operational amplifier 34.

A timing generator incorporated in the system control unit 15 shown in FIG. 15 generates, at appropriate timing points described below, the switch control signals φin(1) to φin(m) that control on (closed)/off (open) switching of the input switches 31-1 to 31-$m$, respectively, the switch control signal φref that controls on/off switching of the reference switch 32, the switch control signal φs that controls on/off switching of the reset switch 35, and the switch control signals φb(1) to φb(m) that control on/off switching of the feedback switches 36-1 to 36-$m$, respectively. That is, these signals serve as timing signals.

As can be seen from the above description, in the unit readout circuit 13-$i$ according to the present exemplary embodiment, some sub-circuits of the unit readout circuit 13-$i$, that is, the reference switch 32, the input side capacitor 33, the operational amplifier 34, and the reset switch 35, are shared by m columns of the pixel array. Such a configuration can reduce the circuit area occupied by the column processing unit 13. Accordingly, the chip size of the CMOS image sensor 10 can be reduced.

Circuit Configuration of Switch

Exemplary circuit configurations of the input switches 31-1 to 31-$m$, the reference switch 32, the reset switch 35, and the feedback switches 36-1 to 36-$m$ are described next.

In FIG. 3, the input switches 31-1 to 31-$m$, the reference switch 32, the reset switch 35, and the feedback switches 36-1 to 36-$m$ are represented by using symbols used for describing a mechanical switch. However, in practice, these switches are formed from electrical switch circuits. The electrical switch circuit is formed by an NMOS transistor alone, a single PMOS transistor alone, or a CMOS transistor.

Figure 4A:
FIGS. 4A to 4C are diagrams illustrating symbols used for describing a switch.
Figure 4A:
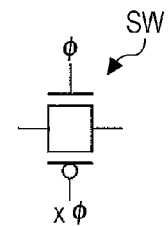
Figure 4B:
Figure 4B:
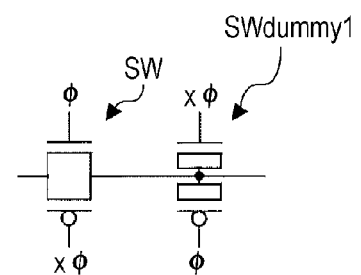
Figure 4C:
Figure 4C:
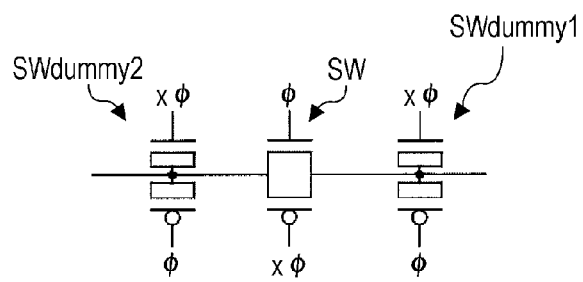

In this example, as shown in FIG. 4A, description is made with reference to a switch SW composed of a CMOS transistor. Symbols used for describing a switch are described next. As shown in FIG. 4B, a switch having a black circle at one terminal end thereof indicates that a dummy switch SWdummy is connected to the terminal end. In addition, as shown in FIG. 4C, a switch having a black circles at either terminal end thereof indicates that dummy switches SWdummy1 and SWdummy2 are connected to either terminal end.

For ease of understanding, the operation of the dummy switch SWdummy is described with reference to a switch composed of an NMOS transistor shown in FIG. 5A.

1. Charge Injection (Due to Charge Division)

For example, when a switch control signal φ changes from a logical 1 to a logical 0, about one half of the electrical charge existing in a channel of a transistor Tr1 forming a switch SW is injected into load capacitance CL on the right.

Let W denote the channel width of the transistor Tr1, L denote the channel length, Cs denote the parasitic capacitance between the gate and the source of the transistor Tr1, and V(φ) denote the voltage (the crest value) of the switch control signal φ. Then, by using a general expression Q=C×V, the above-described charge Q is expressed as follows:

$$Q = Cs \times V(\phi) = (1/2) \times (\in \times L \times W/tox)$$

where $\in$ denotes the dielectric constant, and tox denotes the thickness of the gate oxide film of the transistor Tr1.

By dividing the capacitance Q by the load capacitance CL, the error voltage with respect to the input signal can be obtained. As shown in FIG. 5B, in order to correct the error voltage, the source and the drain are short circuited. In addition, a dummy switch SWdummy is provided that is composed of a transistor Tr2 having a channel width W of a size half that of the transistor Tr1 of the switch SW and that is operated with a switch control signal xφ having a phase opposite to that of the switch control signal φ. The reason why the size of the transistor Tr2 is half that of the transistor Tr1 is that about one half of the channel charge of the transistor Tr1 is injected to the load capacitance CL.

As described above, the dummy switch SWdummy composed of the transistor Tr2 is connected to one terminal side of the switch SW. The source and drain of the transistor Tr2 are short-circuited. The transistor Tr2 has a channel width W having a size half the size of the transistor Tr1 and is operated with the switch control signal xφ having a phase opposite to that of the switch control signal φ. This configuration can cancel the electrical charge injected into the load capacitance CL, and therefore, an error voltage does not occur theoretically.

Clock Feedthrough (Due to Voltage Division)

Figure 5A:
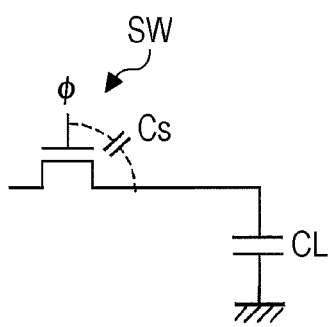
FIGS. 5A and 5B are first diagrams illustrating an exemplary operation of a dummy switch.
Figure 5B:
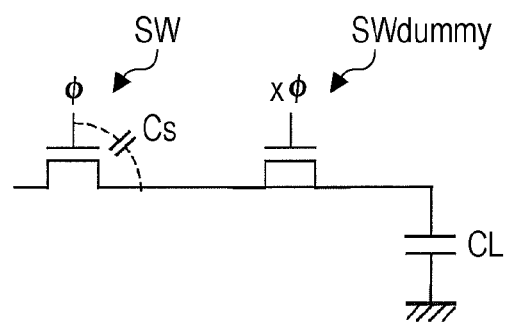
Figure 6A:
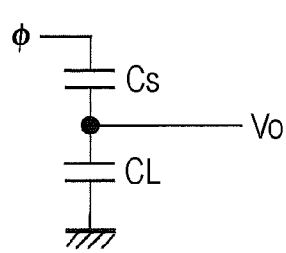
FIGS. 6A and 6B are second diagrams illustrating an exemplary operation of a dummy switch.
Figure 6B:
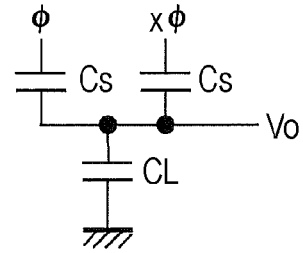

FIGS. 6A and 6B are equivalent circuit diagrams of FIGS. 5A and 5B, respectively. In FIG. 6A, when the switch control signal φ is changed from a logical 1 to a logical 0, the voltage is divided by the parasitic capacitance Cs and the load capacitance CL. Therefore, the voltage becomes Cs/(CL+Cs), which is an error component.

In order to cancel this error component, the dummy switch SWdummy having a capacitance close to or the same as the parasitic capacitance Cs is connected to one terminal side of the switch SW. Thereafter, the dummy switch SWdummy is operated in a complementary fashion with the switch SW. That is, when the switch SW is turned off, the dummy switch SWdummy is turned on. In this way, an error voltage due to the clock (the switch control signal φ) can be canceled.

As can be seen from the above description, the dummy switch SWdummy can cancel an error voltage due to electrical charge division and voltage division occurring when the switch SW is changed from an ON state to an OFF state in response to the switch control signal φ.

In the unit readout circuit 13-$i$ shown in FIG. 3, by using the switch SW having the dummy switch SWdummy connected to at least one terminal thereof for, in particular, the input switches 31-1 to 31-$m$ connected to the input side of the operational amplifier 34, the reference switch 32, the reset switch 35, and the feedback switches 36-1 to 36-$m$, the circuit operation described below can be reliably performed.

However, the input switches 31-1 to 31-$m$, the reference switch 32, the reset switch 35, and the feedback switches 36-1 to 36-$m$ are not limited to the switch SW having the dummy switch SWdummy, but may be normal analog switches having no dummy switch SWdummy.

Circuit Operation of Unit Readout Circuit

An exemplary circuit operation of the unit readout circuit 13-$i$ (13-1 to 13-$x$) of the column processing unit (the signal readout circuit unit) 13 is described next with reference to a timing diagram shown in FIG. 7. In the following description, let C1 denote the capacitance value of the input side capacitor 33, and let C2(1) to C2($m$) denote the capacitance values of the feedback capacitors 37-1 to 37-$m$, respectively.

Processing of Reset Signal Vreset

In a period t(1), the switch control signals φs, φin(1), and φb(1) become active (are turned to a logical 1/a high level), and therefore, the reset switch 35, the input switch 31-1, and the feedback switch 36-1 are turned on. Accordingly, a reset signal Vreset(1) read from the unit pixel 20 located in the first column of the m columns is accumulated in the input side capacitor 33. In addition, since the input and output terminals of the operational amplifier 34 are short-circuited, the feedback capacitor 37-1 is reset. Suppose that an output voltage Vout generated when the input and output terminals of the operational amplifier 34 are short-circuited is ideally zero. Then, the electrical charge expressed by C1·Vreset(1) is accumulated in the input side capacitor 33.

In a period t(2), when the switch control signal φb(1) is active, the reset switch 35 can be turned off by setting the switch control signal φs to be inactive. Thereafter, the switch control signal φref becomes active, and the reference switch 32 is turned on. Thus, the reference voltage Vref is input to the input side capacitor 33. Accordingly, an electrical charge having a value of C1·(Vreset(1)−Vref) is transferred to the output side. At that time, since the voltage is amplified with an amplification factor (a gain) determined by the capacitance ratio, the voltage is C1/C2(1)·(Vreset(1)−Vref).

In a period t(3), the input/output switch control signals φs, φb(2), and φin(2) become active, and therefore, the reset switch 35, the feedback switch 36-2, and the input switch 31-2 are turned on. Accordingly, a reset signal Vreset(2) for the second column of the m columns is accumulated in the input side capacitor 33. In addition, since the input and output terminals of the operational amplifier 34 are short-circuited, the feedback capacitor 37-2 is reset. At that time, electrical charge expressed by C1·Vreset(2) is accumulated in the input side capacitor 33.

In a period t(4), when the switch control signal φb(2) is active, the reset switch 35 is turned off by setting the switch control signal φs to be inactive. Thereafter, the switch control signal φref becomes active, and the reference switch 32 is turned on. Thus, the reference voltage Vref is input to the input side capacitor 33. Accordingly, an electrical charge having a value of C1·(Vreset(2)−Vref) is transferred to the output side. At that time, the voltage is C1/C2(2)·(Vreset(2)−Vref). Subsequently, a similar operation is repeated for the third column to the m-th column of the m columns.

Processing of Light Accumulation Signal Vsig

The operation relating to the reset signal Vreset is repeated until the m-th column is processed. Thereafter, in a period t(2$m$+1), when the switch control signal φs is active, the switch control signal φref becomes active, and the reference switch 32 is turned on. Thus, the reference voltage Vref is input to the input side capacitor 33. Accordingly, an electrical charge of C1·Vref is accumulated in the input side capacitor 33.

In a period t(2$m$+2), the switch control signals φin(1) and φb(1) become active, and the input switch 31-1 and the feedback switch 36-1 are turned on. Accordingly, a received-light photoelectric conversion signal Vsig(1) read out from the unit pixel 20 located in the first column of the m columns is input to the input side capacitor 33. At that time, the electrical charge expressed by C1·(Vref−Vsig(1)) is accumulated in the input side capacitor 33.

In contrast, since the feedback capacitor 37-1 stores the electrical charge transferred in the periods t(1) and t(2), a charge equal to the difference, that is, C1·(Vreset(1)−Vref+ Vref−Vsig(1))=C1·(Vreset(1)−Vsig(1)) is transferred to the output side. As a result, the output voltage Vout(1) is:

$$Vout(1)=C1/C2(1)\cdot(Vreset(1)-Vsig(1)).$$

Accordingly, the output voltage Vout(1), which is a pixel signal of the unit pixel 20 in the first column of the m columns, is amplified with an amplification factor defined by a capacitance ratio C1/C2(1) which is a ratio of the capacitance of the input side capacitor 33 to the capacitance of the feedback capacitor 37-1. Furthermore, a difference between the reset signal Vreset(1) and the received-light photoelectric conversion signal Vsig(1) is computed. That is, a correlated double sampling process is performed.

In a period t(2m+3), when the switch control signal φs is active, the switch control signal φref becomes active, and therefore, the reference switch 32 is turned on. Accordingly, the reference voltage Vref is input to the input side capacitor 33, and an electrical charge of C1·Vref is accumulated in the input side capacitor 33.

In a period t(2m+4), the switch control signals φin(2) and φb(2) become active, and therefore, the input switch 31-2 and the feedback switch 36-2 are turned on. Accordingly, a received-light photoelectric conversion signal Vsig(2) read out from the unit pixel 20 located in the second column of the m columns is input to the input side capacitor 33. At that time, an electrical charge expressed by C1·(Vref−Vsig(2)) is accumulated in the input side capacitor 33.

In contrast, since the feedback capacitor 37-2 stores the electrical charge transferred in the periods t(3) and t(4), a charge equal to the difference, that is, C1·(Vreset(2)−Vref+ Vref−Vsig(2))=C1·(Vreset(2)−Vsig(2)) is transferred to the output side. As a result, the output voltage Vout(2) is:

$$Vout(2)=C1/C2(2)\cdot(Vreset(2)-Vsig(2)).$$

Accordingly, the output voltage Vout(2), which is a pixel signal of the unit pixel 20 in the second column of the m columns, is amplified with an amplification factor defined by a capacitance ratio C1/C2(2) which is a ratio of the capacitance of the input side capacitor 33 to the capacitance of the feedback capacitor 37-2. Furthermore, a correlated double sampling process is performed. Subsequently, a similar operation is repeated until the m-th column is processed.

The above-described series of operations are performed for the column processing units 13-1 to 13-x. Accordingly, each of the column processing units 13-1 to 13-x can obtain an output voltage Vout(i) of the unit pixel 20 in the i-th column of the m columns as follows:

$$Vout(i)=C1/C2(i)\cdot(Vreset(i)-Vsig(i)).$$

As described above, in each of the unit readout circuits 13-1 to 13-x, the reference switch 32 and each of the input switches 31-1 to 31-m are alternately turned on, so that the difference between the reset signal Vreset(i) and the reference voltage Vref is transferred to the feedback capacitor 37-i via the input side capacitor 33. Thereafter, the reference switch 32 and each of the input switches 31-1 to 31-m are alternately turned on, so that the difference between the received-light photoelectric conversion signal Vsig(i) and the reference voltage Vref is transferred to the feedback capacitor 37-i via the input side capacitor 33. In this way, the difference between the reset signal Vreset(i) and the received-light photoelectric conversion signal Vsig(i) is read out from each of the columns of the pixel array. Accordingly, even when the reference switch 32, the input side capacitor 33, the operational amplifier 34, and the reset switch 35 are shared by a plurality of the columns of the pixel array, the difference between the reset signal Vreset(i) and the received-light photoelectric conversion signal Vsig(i) (i.e., Vreset(i)−Vsig(i)) can be read out for every plurality of columns of the pixel array. As a result, a CDS process for removing pixel-specific fixed pattern noise can be performed.

While the present exemplary embodiment has been described with reference to the unit readout circuit 13-i (13-1 to 13-x) that reads out the reset signal Vreset from the unit pixel 20 first and, subsequently, reads out the received-light photoelectric conversion signal Vsig, the order in which the signals are read out may be reversed. That is, even when the received-light photoelectric conversion signal Vsig is read out first and, subsequently, the reset signal Vreset is read out, the same advantage can be obtained.

Error Correction in Unit Readout Circuit

The above description of the circuit operation of the unit readout circuit 13-i (13-1 to 13-x) has been made with reference to the case in which the operational amplifier 34 is in an ideal state, that is, the output voltage Vout is 0 (V) when the input terminal and the output terminal of the operational amplifier 34 are short-circuited.

However, in practice, an error occurs in computation performed by the operational amplifier 34. Two dominant error sources are an offset voltage caused by non-zero output voltage Vout when the input terminal and the output terminal of the operational amplifier 34 are short-circuited and a variation in the amplification factors (a variation in the gain) among the columns due to a variation in the capacitances C2(1) to C2(m) of the feedback capacitors 37-1 to 37-m.

Correction of Offset Voltage

In the case of an image captured by the CMOS image sensor 10, the offset voltage, which is one of the errors occurring in computation, appears in the form of vertical streaks. In contrast, the variation in gain appears in the form of vertical streaks generated by variations in the input signals. When an error is taken into account, an output voltage Vout(i) is expressed as follows:

$$Vout(i)=C1/C2(i)\cdot(Vreset(i)-Vsig(i))+Vofs$$

where Vofs represents the offset voltage.

The above-described equation indicates that the offset voltage Vofs can be obtained as the output voltage Vout(i) obtained when the difference between the reset signal Vreset (i) and the received-light photoelectric conversion signal Vsig (i) read out from the unit pixel 20 (i.e., Vreset(i)−Vsig(i)) is set to zero. That is, the offset voltage Vofs can be measured by setting the difference between the reset signal Vreset(i) and the received-light photoelectric conversion signal Vsig(i) to zero.

In addition, by subtracting the offset voltage Vofs from the output voltage Vout(i) of each column after the offset voltage Vofs is measured, the following output voltage Vout(i) having a corrected offset voltage Vofs can be obtained:

$$Vout(i)=C1/C2(i)\cdot(Vreset(i)-Vsig(i)).$$

According to the present exemplary embodiment, the process in which the offset voltage Vofs is subtracted from the output voltage Vout(i) is performed by a signal processing circuit unit (not shown) disposed outside the chip. Note that, like other peripheral circuits, the signal processing circuit unit may be integrated, as an on-chip component, onto the semiconductor substrate on which the pixel array unit 11 is disposed.

Correction of Variation in Gain

Correction of a variation in the gain due to a variation in the capacitance values C2(1) to C2(m) of the feedback capacitors 37-1 to 37-m is described next.

In order to correct a variation in the gain, control is externally performed so that the difference between the reset signal Vreset(i) and the received-light photoelectric conversion signal Vsig(i) read out from the unit pixel 20 (i.e., Vreset(i)–Vsig(i)) becomes a predetermined voltage value (e.g., Vreset(i)–Vsig(i)=1 (V)). After the control is performed, the output voltage Vout(i) is expressed as follows:

$$Vout(i)=C1/C2(i).$$

That is, the output voltage Vout(i) which is a capacitance ratio C1/C2(i) between the input side capacitor 33 and the feedback capacitor 37-i can be obtained without an error. If a correction coefficient A is set to C2(i)/C2, the correction coefficient A can be a coefficient common to all of the columns of the pixel array so that Vout(i)=C1/C2(i)·A=C1/C2.

In order to externally control the difference voltage (Vreset(i)–Vsig(i)) so that the difference voltage is a predetermined value, that is, in order to input any difference signal from the unit pixel 20 into the unit readout circuit 13-i (13-1 to 13-x), the reference voltage Vref can be changed over time, for example.

More specifically, at a time when the unit pixel 20 originally outputs the reset signal Vreset(i) and the received-light photoelectric conversion signal Vsig(i), the inputs from the unit pixel 20 are not used. At that time, the reference switch 32 is turned on. Thus, a dummy signal having a desired difference voltage is input in place of the reference voltage Vref. By controlling only the reference voltage Vref, this control method can be realized. Accordingly, an error due to variations in a gain can be corrected without providing an additional circuit to the unit readout circuit 13-i (13-1 to 13-x).

Application Circuits

Several application examples of the unit readout circuit 13-i (13-1 to 13-x) are described next.

APPLICATION EXAMPLE 1

Figure 8:
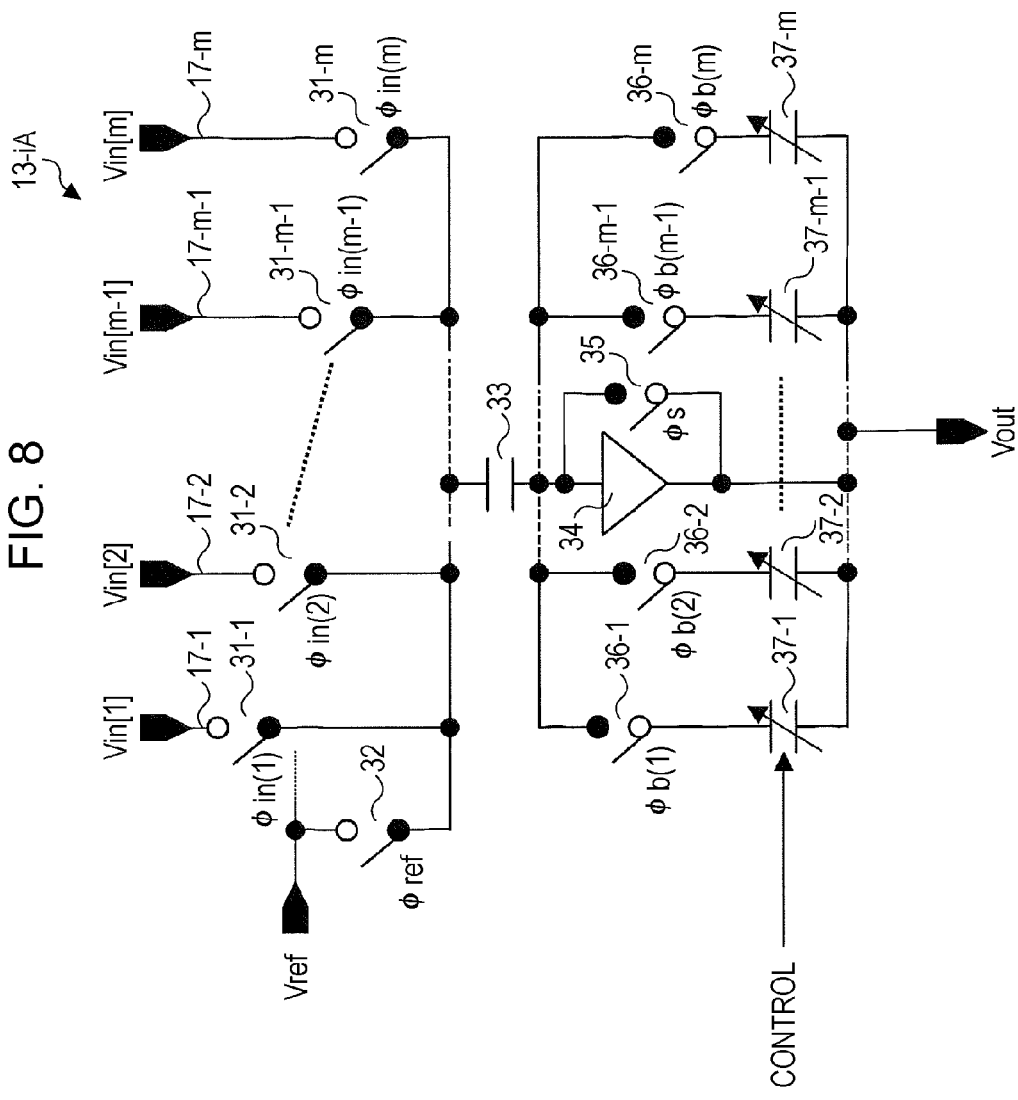
FIG. 8 is a circuit diagram illustrating the circuit configuration of a unit readout circuit according to an application example 1.

FIG. 8 is a circuit diagram illustrating a circuit configuration of a unit readout circuit 13-iA according to an application example 1. The same numbering will be used in describing FIG. 8 as was utilized above in describing FIG. 3, where appropriate.

As shown in FIG. 8, the unit readout circuit 13-iA of the application example 1 uses a variable capacitor for the feedback capacitor 37-i (37-1 to 37-m). Thus, the capacitance value C2(i) of the feedback capacitor 37-i is variable. The signal level of the received-light photoelectric conversion signal Vsig from the unit pixel 20 is monitored by, for example, the system control unit 15 for each of the columns of the pixel array. Thereafter, the system control unit 15 performs control so that, when the signal levels of the received-light photoelectric conversion signal Vsig output from all of the columns or more than a predetermined number of columns are less than a predetermined value, the capacitance value C2(i) of the feedback capacitor 37-i is changed so that the gain is changed to a certain small value for every column of the pixel array.

The gain of the unit readout circuit 13-iA is determined by a capacitance ratio C1/C2(i), which is a ratio of the capacitance of the input side capacitor 33 to the capacitance of the feedback capacitor 37-i. Therefore, by reducing the capacitance value C2(i) of the feedback capacitor 37-i, the gain of the unit readout circuit 13-iA can be increased. Accordingly, when the signal levels of the received-light photoelectric conversion signal Vsig output from all of the columns of the pixel array are less than a predetermined value, these signal levels are amplified with a high gain. Accordingly, input equivalent noise can be reduced. The control timing points used in this example is the same as those indicated by the timing diagram of FIG. 7.

APPLICATION EXAMPLE 2

Figure 9:
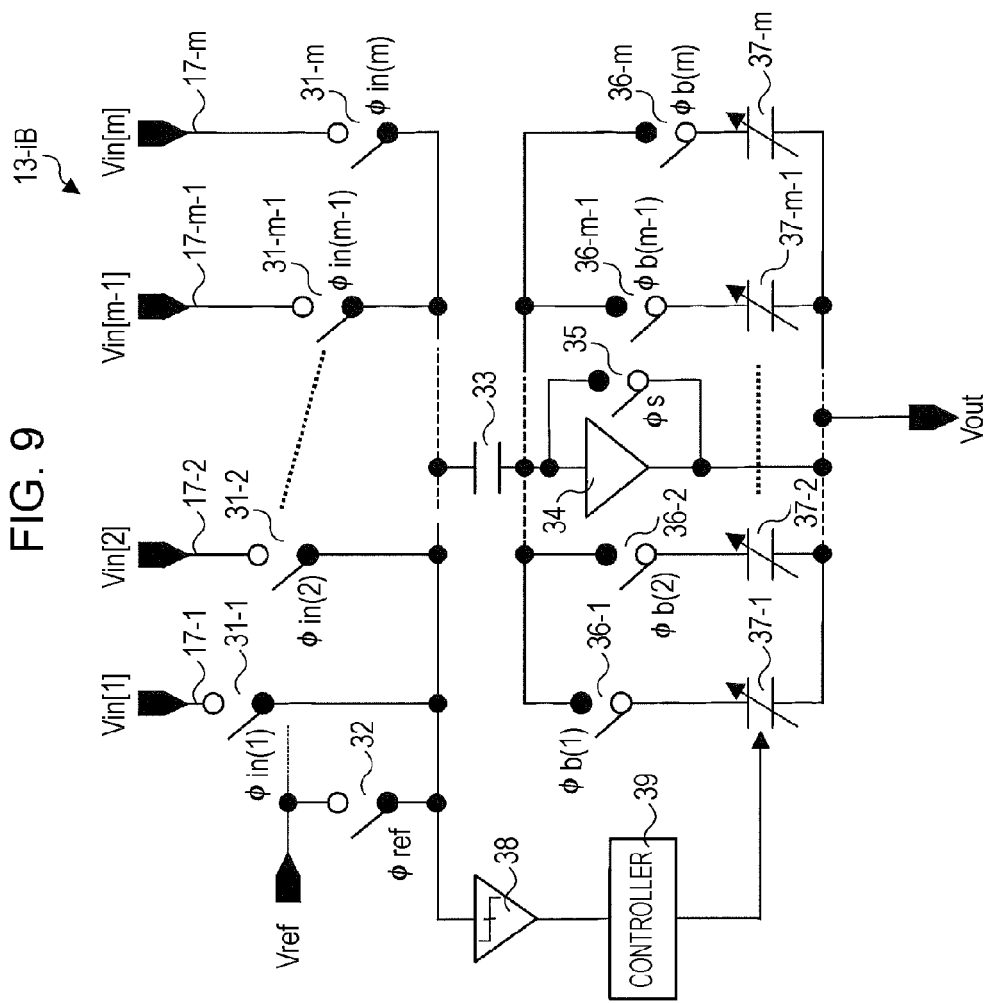
FIG. 9 is a circuit diagram illustrating the circuit configuration of a unit readout circuit according to an application example 2.

FIG. 9 is a circuit diagram illustrating a circuit configuration of a unit readout circuit 13-iB according to an application example 2. The same numbering will be used in describing FIG. 9 as was utilized above in describing FIG. 8, where appropriate.

As shown in FIG. 9, like the unit readout circuit 13-iA according to the application example 1, the unit readout circuit 13-iB of the application example 2 uses a variable capacitor for the feedback capacitor 37-i (37-1 to 37-m). In addition, the unit readout circuit 13-iB includes a comparator 38 for comparing the signal level of the received-light photoelectric conversion signal Vsig from the unit pixel 20 in each of the columns of the pixel array with a predetermined value and a controller 39 for controlling the capacitance value C2(i) of the feedback capacitor 37-i on the basis of the comparison result output from the comparator 38. In this way, the capacitance value C2(i) of the feedback capacitor 37-i is adaptively changed.

More specifically, when the received-light photoelectric conversion signal Vsig is read out from the unit pixel 20 in each of the columns of the pixel array and if the signal level is higher than a predetermined value, the capacitance value C2(i) of the feedback capacitor 37-i is increased under the control of the comparator 38 and the controller 39. However, if the signal level is lower than a predetermined value, the capacitance value C2(i) of the feedback capacitor 37-i is decreased.

As described above, by increasing the capacitance value C2(i) of the feedback capacitor 37-i when the signal level of the received-light photoelectric conversion signal Vsig is higher than a predetermined value, the gain of the unit readout circuit 13-iB can be decreased to a value lower than the gain obtained before the capacitance value C2(i) is changed. Therefore, saturation of the signal can be prevented. In addition, by decreasing the capacitance value C2(i) of the feedback capacitor 37-i when the signal level of the received-light photoelectric conversion signal Vsig is within a predetermined range, the gain of the unit readout circuit 13-iB can be increased to a value higher than the gain obtained before the capacitance value C2(i) is changed. Therefore, a noise resistance can be provided.

The controller 39 can hold a setting value of the gain determined by the capacitance value C2(i) of the feedback capacitor 37-i when the capacitance value C2(i) is changed. In addition, when the output voltage Vout is read out from the unit readout circuit 13-iB, the setting value of the gain is simultaneously read out. The readout setting value can be supplied to a downstream signal processing circuit unit (not shown), and the signal processing circuit unit can return the signal level to the original signal level.

As described above, in the unit readout circuit 13-iB according to the application example 2, by controlling the capacitance value C2(i) of the feedback capacitor 37-i in accordance with the level of the input received-light photoelectric conversion signal Vsig, the gain can be adaptively determined (adaptive amplification). Accordingly, saturation of a signal occurring when the level of the unit pixel 20 is high can be prevented, and noise occurring when the luminance is low can be reduced.

Note that, when the circuit configuration of the application example 2 is employed, the capacitance value C2($i$) of the feedback capacitor 37-$i$ is controlled first so that the gain in accordance with the signal level is set. Accordingly, a signal output from the unit pixel 20 and photoelectrically converted from the received light, that is, the received-light photoelectric conversion signal Vsig is read out by the unit readout circuit 13-$i$B first. Subsequently, the reset signal Vreset is read out.

Figure 10:
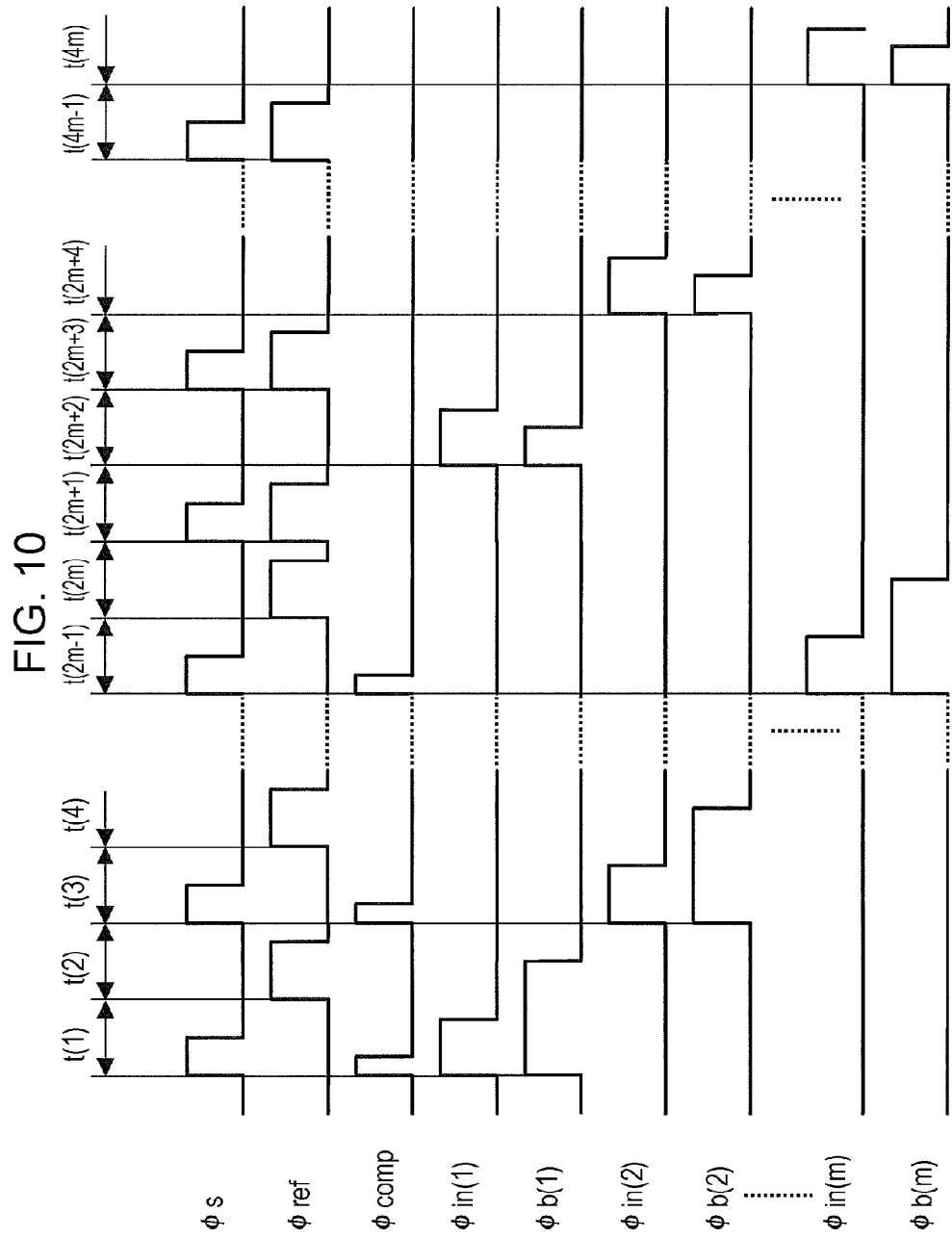
FIG. 10 is a timing diagram illustrating the circuit operation of the unit readout circuit according to the application example 2.

FIG. 10 is a timing diagram used when the received-light photoelectric conversion signal Vsig is read out first and, subsequently, the reset signal Vreset is read out.

Figure 7:
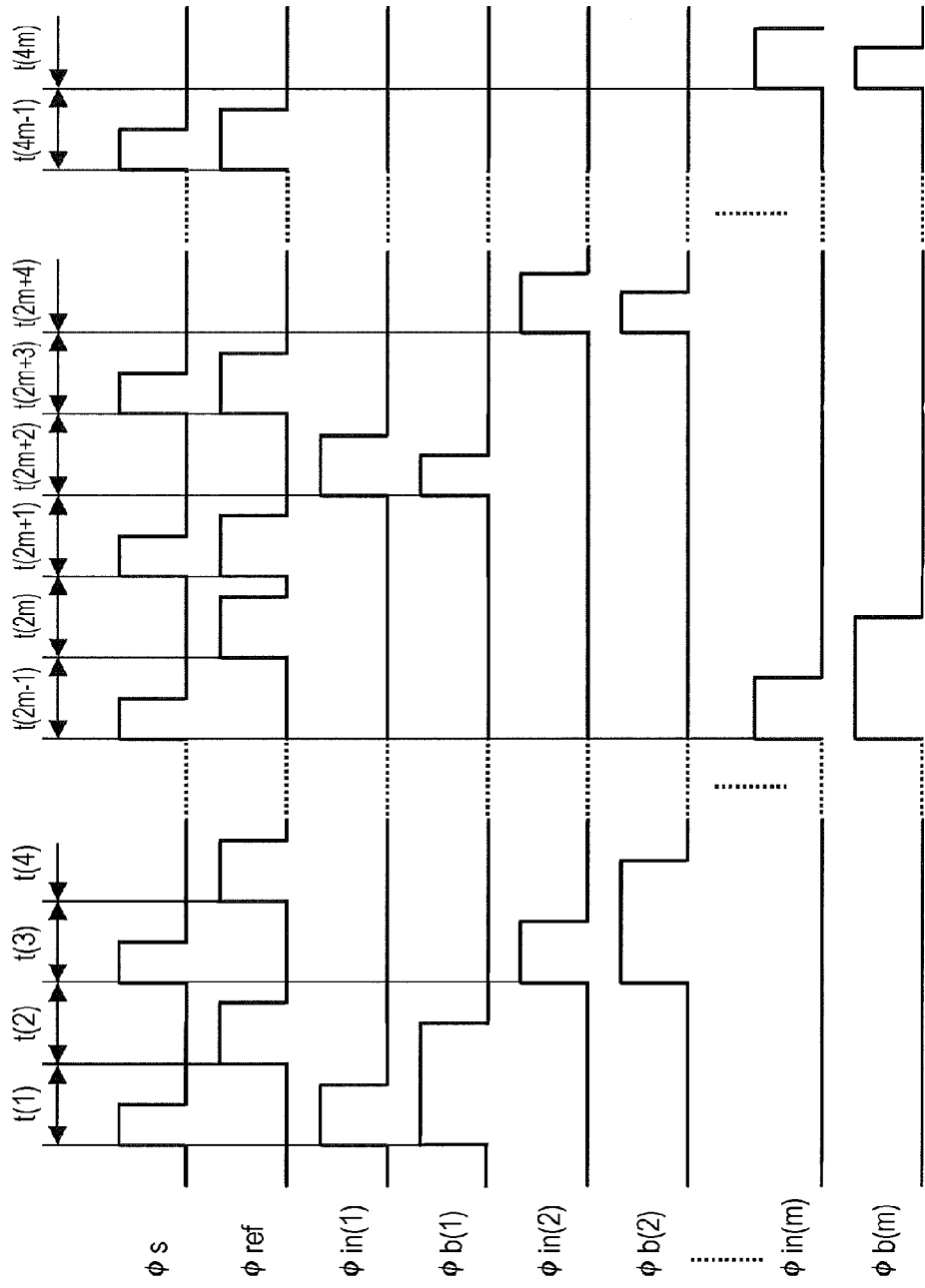
FIG. 7 is a timing diagram illustrating the circuit operation of the unit readout circuit.

The control timing of the unit readout circuit 13-$i$B is similar to the above-described control timing of the unit readout circuit 13-$i$ (see FIG. 7). However, the vertical drive unit 12 controls the unit pixel 20 so that the unit pixel 20 outputs the received-light photoelectric conversion signal Vsig when i<2$m$ for a period t(i), and the unit pixel 20 outputs the reset signal Vreset when i≦2$m$+1.

In the unit readout circuit 13-$i$B, when the received-light photoelectric conversion signal Vsig is output from the unit pixel 20, the comparator 38 compares the signal level of the received-light photoelectric conversion signal Vsig with a predetermined value. In such a case, eventually, the output signal is amplified using the capacitance ratio C1/C2($i$), which is a ratio of the capacitance of the input side capacitor 33 to the capacitance of the feedback capacitor 37-$i$, and is output as the output voltage Vout for each of the unit pixels 20. The output voltage Vout serves as a captured image signal of the CMOS image sensor 10 and is output to outside the chip.

In the unit readout circuit 13-$i$A of the application example 1 and the unit readout circuit 13-$i$B of the application example 2, the capacitance value of the feedback capacitor 37-$i$ (37-1 to 37-$m$) is controlled in accordance with the level of the signal output from the column of the pixel array. However, the following operations are different.

In the unit readout circuit 13-$i$A of the application example 1, when the levels of the signals output from all of the columns or more than a predetermined number of columns are less than a predetermined value, the same control is performed for the columns 1 to $m$ of each of the unit readout circuits 13-1 to 13-$x$. Accordingly, a number of control lines equal to the number of the unit readout circuits 13-1 to 13-$x$ are necessary between the system control unit 15 and the column processing unit 13.

In contrast, in the unit readout circuit 13-$i$B of the application example 2, each of the unit readout circuits 13-1 to 13-$x$ monitors the level of the signal output from each of the columns of the pixel array and performs control for the columns 1 to $m$ of each of the unit readout circuits 13-1 to 13-$x$. Accordingly, the unit readout circuit 13-$i$B can perform control more precisely, as compared with the unit readout circuit 13-$i$A of the application example 1. In addition, control lines are advantageously unnecessary between the system control unit 15 and the column processing unit 13.

In addition, in the application examples 1 and 2, the capacitance value of the feedback capacitor 37-$i$ is variable. By changing the capacitance value, the gain of the unit readout circuit 13-$i$A or the unit readout circuit 13-$i$B can be controlled. However, since the gain is determined by a capacitance ratio C1/C2($i$), which is a ratio of the capacitance of the input side capacitor 33 to the capacitance of the feedback capacitor 37-$i$, the capacitance value of the input side capacitor 33 may be variable, so as to control the capacitance value. Even in such a case, the same advantage can be obtained.

APPLICATION EXAMPLE 3

A unit readout circuit of an application example 3 has a circuit configuration similar to that shown in FIG. 3. However, by using different control timing points, the unit readout circuit can have a signal integration function that takes the integral of the signal values.

More specifically, by switching between the reset signal Vreset and the reference voltage Vref for the same column of the pixel array M times (M is an integer greater than or equal to 2) instead of once, a signal M·(Vreset(i)−Vref) obtained by multiplying the reset signal Vreset by M can be acquired. Thereafter, similarly, by switching between the reference voltage Vref and the received-light photoelectric conversion signal M times, the following output signal Vout(i) can be eventually obtained:

$$Vout(i)=M\cdot C1/C2(i)\cdot(Vreset(i)-Vsig(i)).$$

Figure 11:
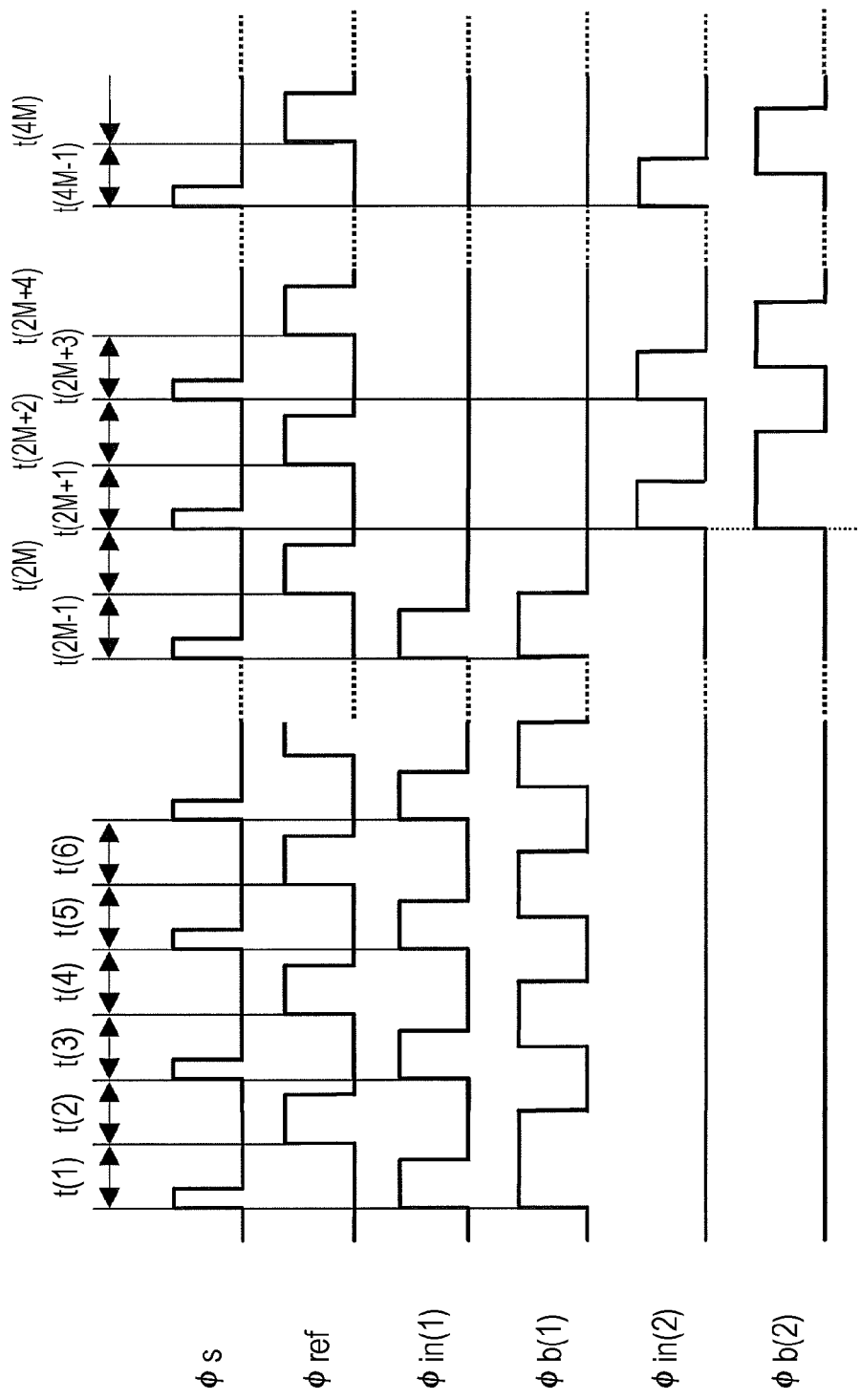
FIG. 11 is a timing diagram illustrating the circuit operation of a unit readout circuit according to an application example 3.

FIG. 11 illustrates control timing used when M integration operations are performed for each of the columns. When the operation is performed for m columns, the computation is performed up to m×M clocks.

In the unit readout circuit of the application example 3, that is, the unit readout circuit having a signal integration function, the reset signal Vreset is sampled m times first and, subsequently, the received-light photoelectric conversion signal Vsig is sampled m times. Accordingly, it is difficult to examine the amplitude of the signal level of the received-light photoelectric conversion signal Vsig in advance. Thus, the signal may be saturated. Therefore, in order to prevent saturation of the signal, the following unit readout circuit 13-$i$C of an application example 4 is proposed.

APPLICATION EXAMPLE 4

Figure 12:
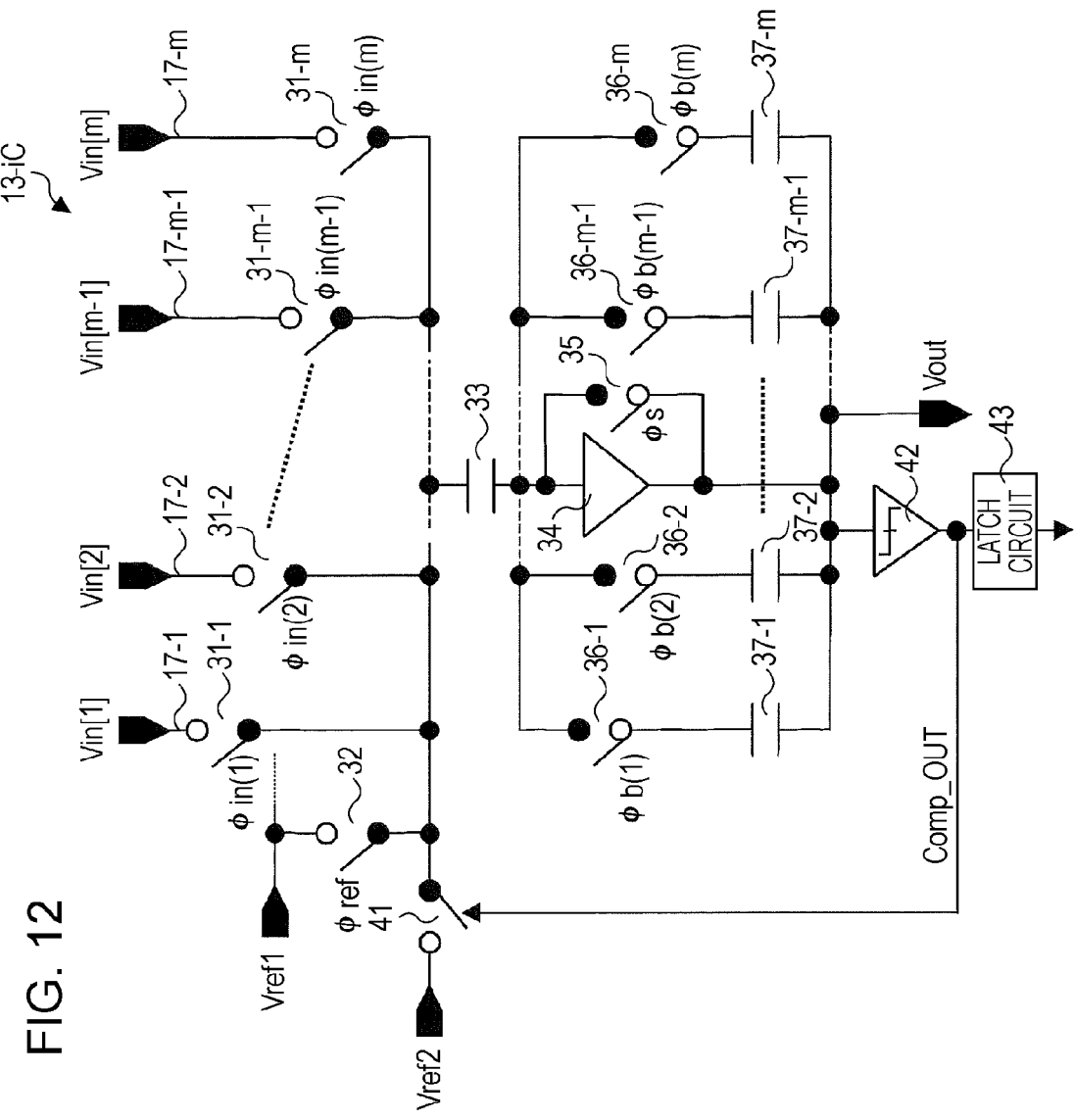
FIG. 12 is a circuit diagram illustrating the circuit configuration of a unit readout circuit according to an application example 4.

FIG. 12 is a circuit diagram illustrating a circuit configuration of a unit readout circuit 13-$i$C according to an application example 4. The same numbering will be used in describing FIG. 12 as was utilized above in describing FIG. 3, where appropriate.

The unit readout circuit 13-$i$C of the application example 4 has a circuit configuration similar to the unit readout circuit of the application example 3 having a signal integration function, that is, the circuit configuration shown in FIG. 3. However, in the unit readout circuit 13-$i$C, a first reference voltage Vref1 (corresponding to the reference voltage Vref shown in FIG. 3) and a second reference voltage Vref2 greater than the first reference voltage Vref1 are used. In addition, the unit readout circuit 13-$i$C includes a reference switch 41, a comparator 42, and a latch circuit 43.

The reference switch 41 selectively provides the second reference voltage Vref2 to the input side capacitor 33 in place of the first reference voltage Vref1. The comparator 42 compares a signal (an output voltage Vout) output from the operational amplifier 34 with a reference value corresponding to a saturation level (precisely speaking, a voltage value slightly lower than the saturation level). If the output voltage Vout is greater than the reference level, the reference switch 41 is turned on by the comparator 42. The latch circuit 43 stores information as to the number of occurrences in which the output voltage Vout exceeds the reference value for the columns of the pixel array on the basis of the comparison results output from the comparator 42. The information as to the number of occurrences in which the output voltage Vout exceeds the reference value is used for restoring a signal, as described below.

In the unit readout circuit 13-*i*C having such a circuit configuration, when the output voltage Vout of the operational amplifier 34 is likely to be saturated, the second reference voltage Vref2, not the first reference voltage Vref1, is supplied to the input side capacitor 33. Accordingly, the second reference voltage Vref2 having a voltage value greater than the first reference voltage Vref1 is subtracted from the signal output from the operational amplifier 34. In this way, the level of the signal that is likely to be saturated can be reduced. As a result, saturation of the signal level can be prevented.

Here, the values of the first reference voltage Vref1 and the second reference voltage Vref2 are externally set to predetermined values. Accordingly, in the unit readout circuit 13-*i*C, even when the second reference voltage Vref2 is subtracted in the unit readout circuit 13-*i*C, the original data can be restored by outputting the information stored in the latch circuit 43, that is, the information as to the number of occurrences in which the output voltage Vout exceeds the reference value is used for restoring a signal to an external signal processing circuit together with the output voltage Vout. Thus, the signal processing circuit can obtain the original data by performing computation on the basis of the predetermined second reference voltage Vref2 and the number of occurrences in which the output voltage Vout exceeds the reference value.

As shown by the timing diagram in FIG. 11, by controlling the reference switch 41 using a switch control signal φref2 at the same timing as the reference switch 32 is controlled using the switch control signal φref, the above-described process for preventing saturation of the signal can be realized.

Figure 13:
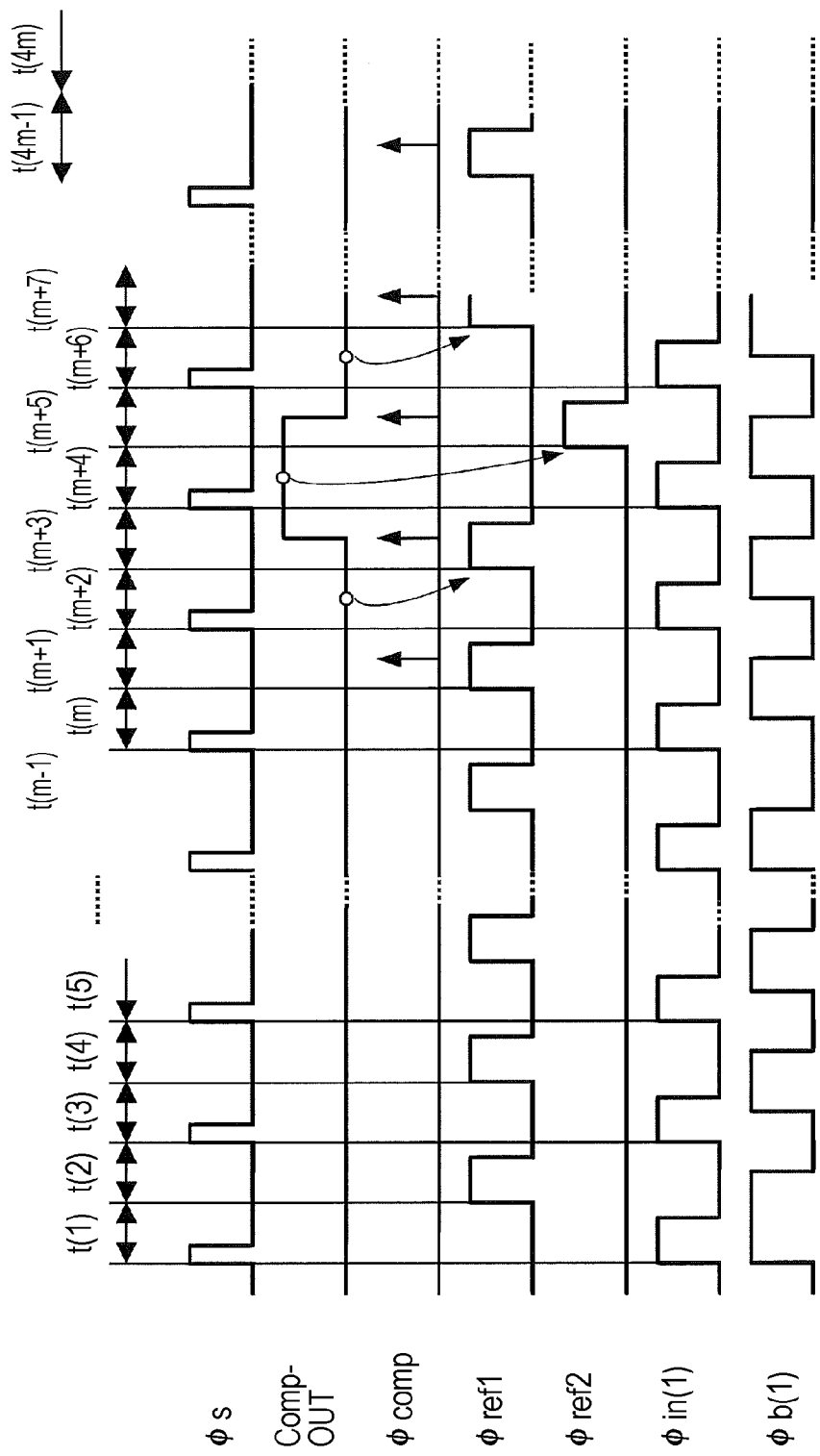
FIG. 13 is a timing diagram illustrating the circuit operation of the unit readout circuit according to the application example 4.

FIG. 13 is a timing diagram illustrating an exemplary circuit operation of the unit readout circuit 13-*i*C of the application example 4. In this example shown in FIG. 13, the integration is performed twice. In a third time, the comparison performed by the comparator 42 indicates that saturation is likely to occur.

In the timing diagram shown in FIG. 13, the input reset signal Vreset is sampled M times. The sampled signals are transferred to the feedback capacitor 37-*i* so that the electrical charge having the reset level is accumulated. Subsequently, the input received-light photoelectric conversion signal Vsig is sampled. Similarly, the sampled signals are transferred to the feedback capacitor 37-*i*. At that time, the comparator 42 monitors the output voltage Vout and performs control so that the output voltage Vout is not saturated.

The voltage value used for the reference value in comparison performed by the comparator 42 is externally adjustable. As noted above, the reference value is set to the voltage value that allows detection of saturation of a signal (precisely speaking, a value slightly less than the saturation voltage).

As shown in FIG. 13, the timing diagram indicates that the comparison output of the comparator 42 in the second integration is a logical "1" and, therefore, saturation possibly occurs in the next integration. Therefore, the switch control signal φref2, not the switch control signal φref1, is made active. Accordingly, as noted above, the level of the signal that is likely to be saturated is reduced using the second reference voltage Vref2. As a result, saturation of the output voltage Vout of the unit readout circuit 13-*i*C can be prevented.

APPLICATION EXAMPLE 5

Figure 14:
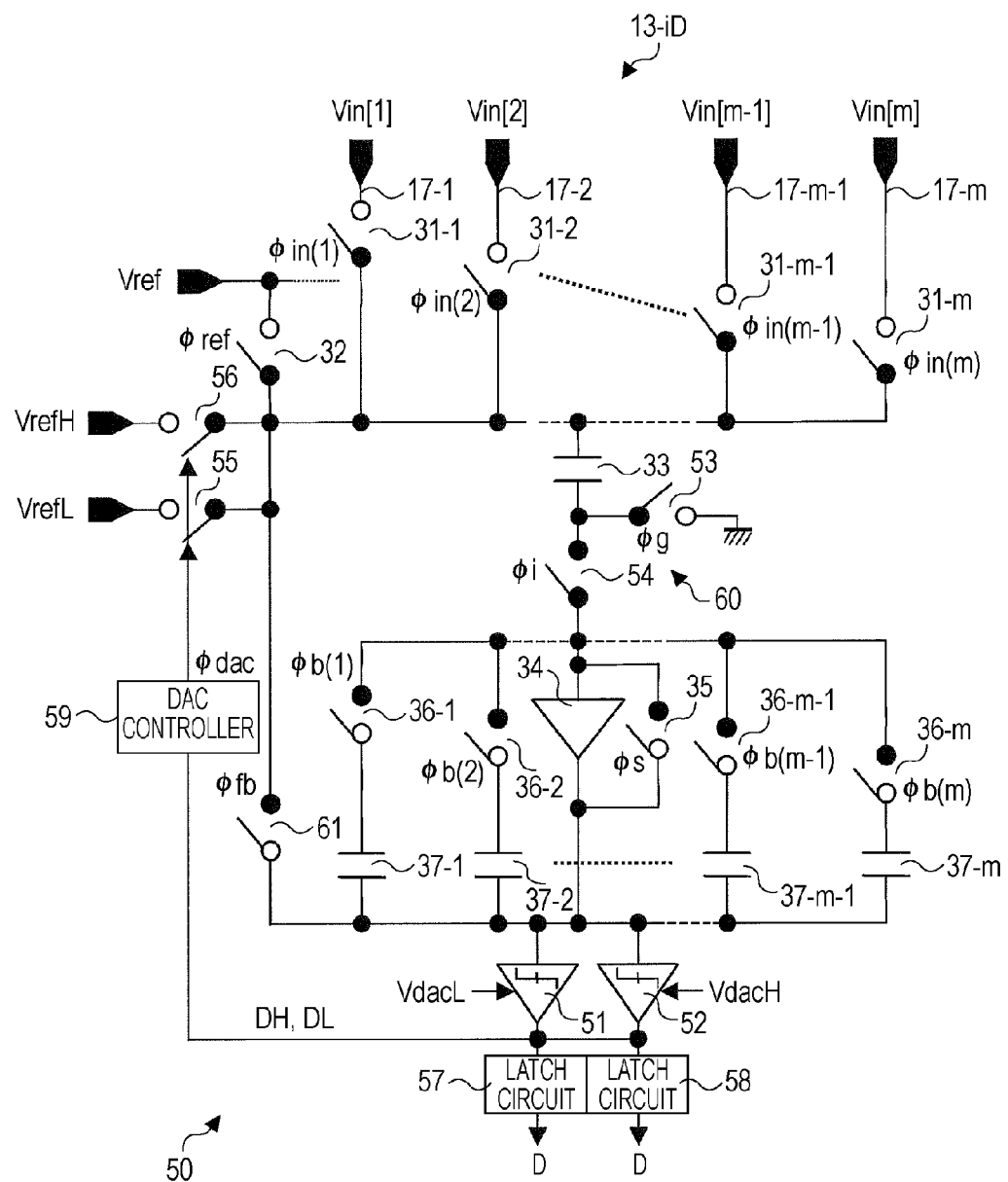
FIG. 14 is a circuit diagram illustrating the circuit configuration of a unit readout circuit according to an application example 5.

FIG. 14 is a circuit diagram illustrating a circuit configuration of a unit readout circuit 13-*i*D according to an application example 5. The same numbering will be used in describing FIG. 14 as was utilized above in describing FIG. 12, where appropriate.

The unit readout circuit 13-*i*D of the application example 5 includes an analog-to-digital (AD) converter, which is, for example, a 1.5-bit cyclic AD converter that converts data to 1.5-bit data per cycle.

As shown in FIG. 14, a 1.5-bit cyclic AD converter 50 is integrated into the unit readout circuit 13-*i*D. The 1.5-bit cyclic AD converter 50 includes two comparators 51 and 52 on the output side of the operational amplifier 34. Each time the output voltage Vout is output from the operational amplifier 34, the two comparators 51 and 52 operate so that the output voltage Vout is compared with each of two reference values VdacL and VdacH. In this way, the input signal level of the output voltage Vout to be subjected to AD conversion is examined.

Figure 15:
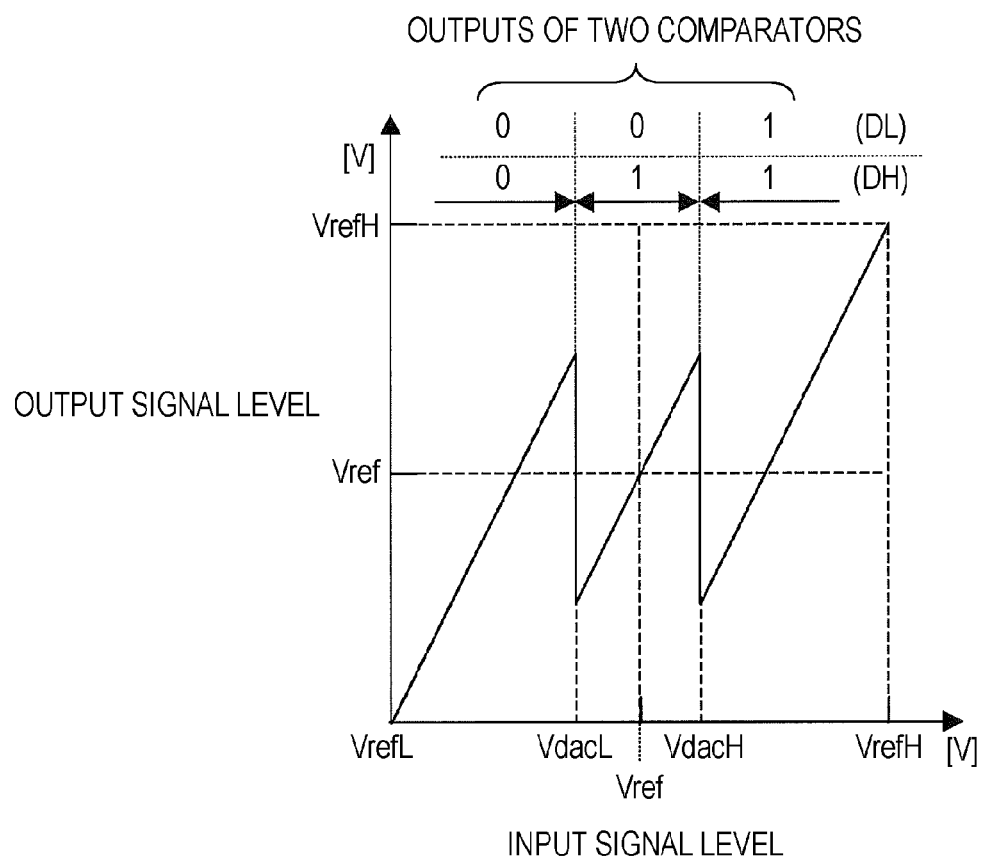
FIG. 15 illustrates the input and output characteristics (the AD conversion characteristics) for each stage of a 1.5-bit cyclic AD converter.

FIG. 15 illustrates the input and output characteristics (the AD conversion characteristics) for each stage. As shown in FIG. 15, the 1.5-bit cyclic AD converter 50 divides the full-scale range (the maximum amplitude) of the input signal level (the output voltage Vout output from the operational amplifier 34) of the 1.5-bit cyclic AD converter 50 into three sub-ranges. For the three sub-ranges, the 1.5-bit cyclic AD converter 50 performs AD conversion to generate three values. Accordingly, one of the following three digital codes D(i−1), which is a combination of comparison results DL and DH output from the comparators 51 and 52, respectively, is assigned to each of the three sub-ranges: Low (DL=0, DH=0), Middle (DL=0, DH=1), and High (DL=1, DH=1).

Here, let a reference voltage Vref denote a half of the full scale of the input signal level, VrefL denote the minimum value, and VrefH denote the maximum value. Then, the reference value VdacL is set so as to be in the range of VrefL to Vref, and the reference value VdacH is set so as to be in the range of Vref to VrefH. In addition, the three sub-ranges are set to the range from the minimum value VrefL to the reference value VdacL, the range from the reference value VdacL to the reference value VdacH, and the range from the reference value VdacH to the maximum value VrefH.

That is, as shown in FIG. 14, the relationship between the digital code D(i−1) and the output voltage Vout(i) of the operational amplifier 34, which is an input signal level, is expressed as follows:

$$D(i-1)=\text{High}(11) \text{ if } VdacH<Vout(i),$$

$$D(i-1)=\text{Middle}(01) \text{ if } VdacL<Vout(i)<VdacH,$$

and $$D(i-1)=\text{Low}(00) \text{ if } VdacL>Vout(i).$$

In addition, a sample and hold (S/H) circuit is necessary in the 1.5-bit cyclic AD converter 50. The S/H circuit may be disposed on the output side of the operational amplifier 34. However, in this example, an input circuit provided for m columns has an S/H function. That is, the input side capacitor 33 provided for m columns and switches 53, 54, and 61 form an S/H circuit 60.

The minimum value VrefL and the maximum value VrefH of the full scale are selectively supplied to the input side capacitor 33 by reference switches 55 and 56 as a reference voltage. The comparison results DL and DH output from the comparators 51 and 52, respectively, are latched by latch circuits 57 and 58 and are supplied to a digital-to-analog conversion (DAC) controller 59. The DAC controller 59 controls on/off switching of the reference switches 32, 55, and 56 on the basis of the comparison results DL and DH output from the comparators 51 and 52, that is, the digital code D(i−1). Here, DL represents the comparison result between VdacL and the output voltage output from the feedback circuit (an amplified pixel signal), and DH represents the comparison result between VdacH and the output voltage output from the feedback circuit (an amplified pixel signal).

Figure 16:
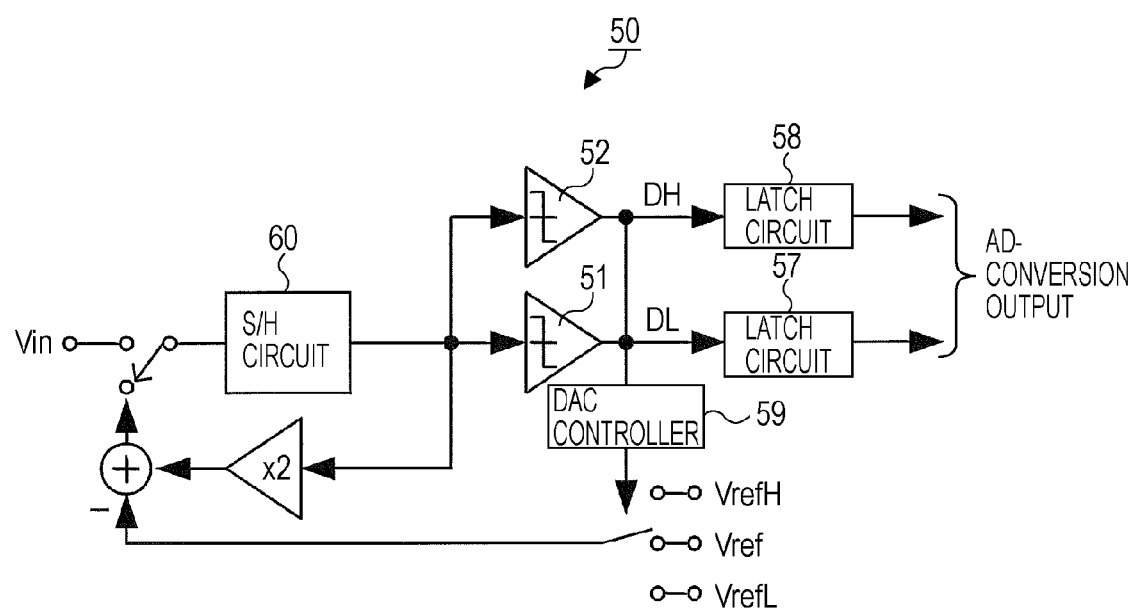
FIG. 16 is a schematic illustration of the 1.5-bit cyclic AD converter.

FIG. 16 is a schematic illustration of the 1.5-bit cyclic AD converter 50. The same numbering will be used in describing FIG. 16 as was utilized above in describing FIG. 14, where appropriate.

In the 1.5-bit cyclic AD converter 50, the comparators 51 and 52 operate on alternate clock cycles (the cycles of a clock signal φcomp described below). Thus, the digital data DL and DH are output from the comparators 51 and 52, respectively. At that time, the output voltage Vout(i) output from the operational amplifier 34 and to be input to an AD conversion process is divided into three sub-ranges: Low(00), Middle (01), and High(11). Subsequently, computation is performed using the following expressions:

$$Vout(i) = 2Vout(i-1) - D(i-1)*Vref$$

$$D(i-1)*Vref = VrefL$$

$$\ldots \text{(Low)} Vout(i-1) < VdacL$$

$$D(i-1)*Vref = Vref$$

$$\ldots \text{(Middle)} VdacL < Vout(i-1) < VdacH$$

$$D(i-1)*Vref = VrefH$$

$$\ldots \text{(High)} VdacH < Vout(i-1).$$

Note that these expressions can be used for the 1.5-bit cyclic AD converter 50 of a single-ended type. When the 1.5-bit cyclic AD converter 50 is of a differential type, a positive/negative sign of the output voltage Vout(i) is taken into account.

The above-described expressions indicate the following series of operations. That is, AD conversion is sequentially performed from a higher-order digit. An input signal level Vout(i−1) is doubled. A value determined by the AD-converted doubled input signal Vout(i−1) is subtracted from the AD-converted doubled input signal Vout(i−1) so that the output level is adjusted so as to be within the full scale of the output voltage Vout(i−1) in any case. The resultant value is returned to the input side, and the similar operations are repeated. Thus, multi-bit AD conversion is performed.

In a binary system, each digit represents one of two values: a logical 0 or a logical 1. In contrast, in the 1.5-bit cyclic AD converter 50 having the above-described configuration, each digit represents one of three values: Low(00), Middle(01), and High(11). Therefore, it can be considered that 1.5-bit AD conversion is performed in each stage. For this reason, such an AD converter is referred to as a "1.5-bit cyclic AD converter".

In the 1.5-bit cyclic AD converter 50, since AD conversion is performed using three values for each operation (each digit), the digital value has redundancy. This redundancy provides more error-free threshold value, as compared with 1-bit cyclic AD converter that performs AD conversion using one threshold value (a comparison reference value) without redundancy. That is, even when the comparison reference values VdacL and VdacH of the comparators 51 and 52 have an offset, comparison results that are the same as those obtained when the comparison reference values VdacL and VdacH have no offsets can be obtained. Therefore, high-precision AD conversion can be performed without the necessity of high-precision comparators 51 and 52.

In the 1.5-bit cyclic AD converter 50, each of the latch circuits 57 and 58 outputs a digital value D (1, 2, . . . N−1). In the downstream signal processing, the digital values D are weighted and added so that N-bit digital data is generated. The operation of the 1.5-bit cyclic AD converter 50 may be independently performed, or may be performed in cooperation with the above-described integration operation or the adaptive amplification operation.

In the unit readout circuit 13-iD including the 1.5-bit cyclic AD converter 50, by performing AD conversion of the reset level (the reset signal) Vreset and, subsequently, performing AD conversion of the signal level (the received-light photoelectric conversion signal) Vsig, and performing subtraction on the two output digital values in the downstream signal processing circuit, a correlated double sampling (CDS) process can be performed in the digital region.

If a correlated double sampling process is performed in the analog region, an AD-converted value of a signal subjected to the correlated double sampling process can be obtained by accumulating an electrical charge expressed by (Vreset−Vsig) in the feedback capacitor 37-i and AD-converting the output voltage.

Figure 17:
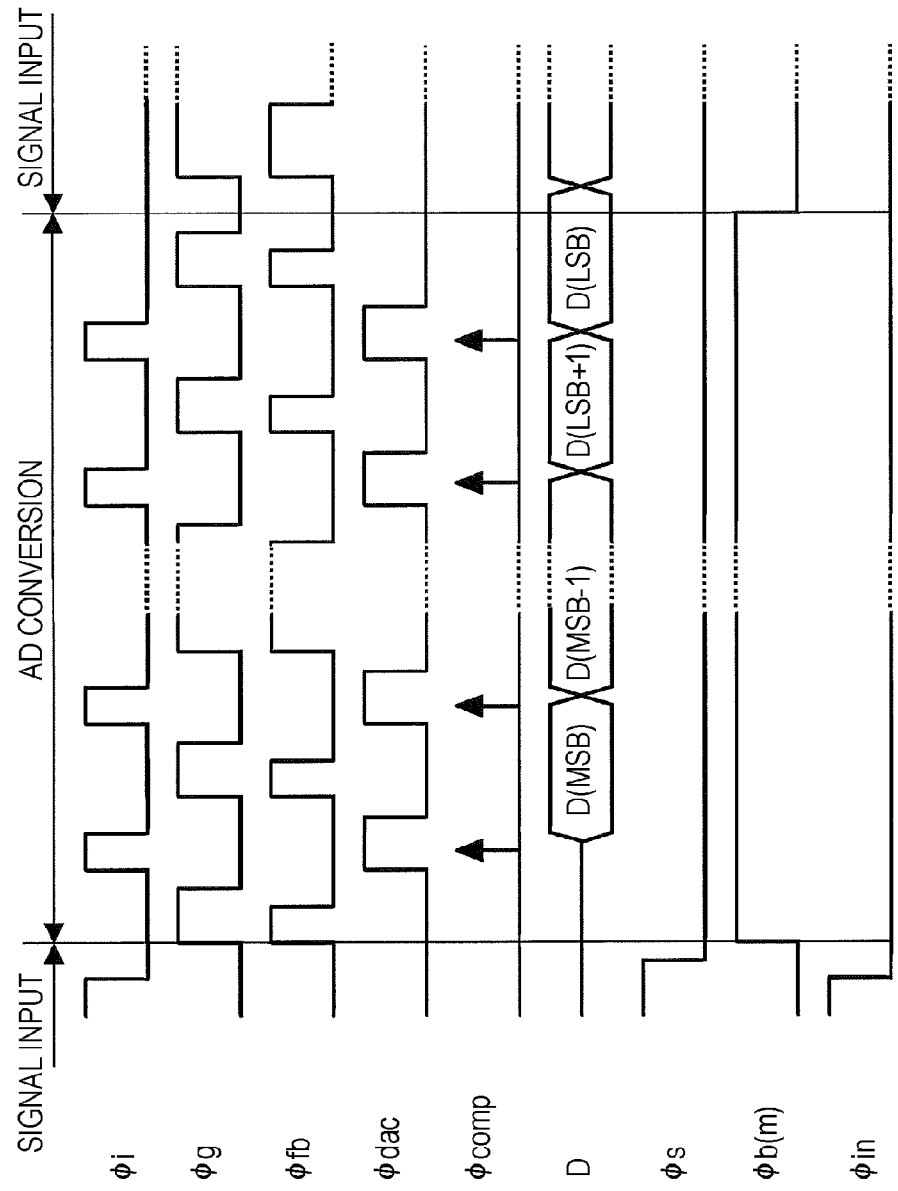
FIG. 17 illustrates the waveforms of signals when 1.5-bit cyclic AD conversion is performed.

FIG. 17 is a timing diagram when the 1.5-bit cyclic AD conversion is performed. In the timing diagram shown in FIGS. 17, φg and φi denote the switch control signals for on/off switching the switches 53 and 54 of the S/H circuit 60, respectively. φfb denotes the switch control signals for on/off switching the feedback switch 61 connected between the output end of the operational amplifier 34 and the input end of the input side capacitor 33. φdac denotes the switch control signals for on/off switching the reference switches 55 and 56. φcomp denotes the clock signal for the comparators 51 and 52. D denotes AD-conversion output data which is output from the latch circuits 57 and 58.

Generally speaking, in the 1.5-bit cyclic AD converter 50, a signal that is subjected to a CDS process for a pixel and that is accumulated in the feedback capacitor 37-i is read out and is AD-converted. Subsequently, a signal accumulated in the next feedback capacitor 37-i+1 is read out and is AD-converted. Such operation is repeatedly performed.

Hereinabove, the basic operation concept of the 1.5-bit cyclic AD converter 50 has been described. However, the application example 5 is characterized in that the present exemplary embodiment is applied to a 1.5-bit cyclic AD converter. Since the basic circuit operation regarding AD conversion is not changed by the present exemplary embodiment, detailed description of the circuit operation of the 1.5-bit cyclic AD converter 50 is not provided.

As can be seen from the above description, in the 1.5-bit cyclic AD converter 50, the reference switch 32, the input side capacitor 33, and the operational amplifier 34 are necessary as circuit components in order to perform AD conversion processing. If these circuit components, that is, the input side capacitor 33 and the operational amplifier 34, are provided for each of the m columns of the pixel array, the circuit area occupied by the column processing unit 13 is increased, and therefore, it is difficult to reduce the chip size of the CMOS image sensor 10.

In contrast, according to the application example 5, in the unit readout circuit 13-iD having a 1.5-bit cyclic AD conversion function, some sub-circuits of the unit readout circuit 13-iD, that is, the reference switch 32, the input side capacitor 33, and the operational amplifier 34, are shared by m columns of the pixel array. Such a configuration can reduce the circuit area occupied by the column processing unit 13. Accordingly, the chip size of the CMOS image sensor 10 can be reduced.

While the application example 5 has been described with reference to the case where the present exemplary embodiment is applied to the unit readout circuit 13-iD including the 1.5-bit cyclic AD converter 50, the AD converter is not limited to the 1.5-bit cyclic AD converter 50. For example, the present exemplary embodiment is applicable to a variety of unit readout circuits including an AD converter, such as a 1-bit cyclic AD converter having circuit components, such as an input side capacitor and an operational amplifier.

APPLICATION EXAMPLE 6

In the column processing unit 13-i according to the present exemplary embodiment shown in FIG. 3 and the unit readout circuits 13-iA to 13-iD according to the application examples 1 to 5 of the present exemplary embodiment, a single input side capacitor 33 is used for CDS and AD conversion. However, by providing a plurality of input side capacitors 33, the input side capacitors 33 can be used for a pixel summation process in which signals of a plurality of pixels arranged in the horizontal direction and the vertical direction are summed.

Figure 18:
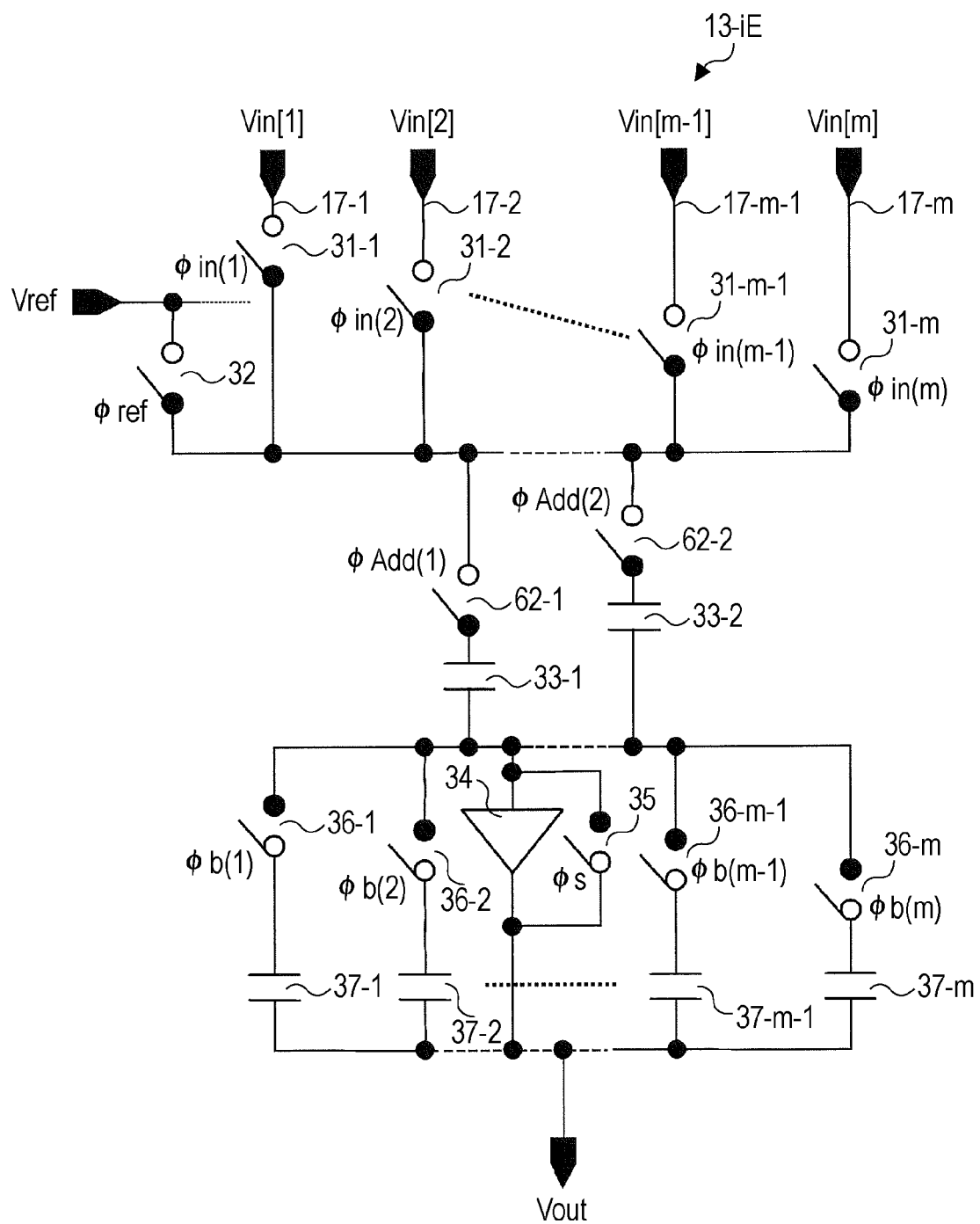
FIG. 18 is a circuit diagram illustrating the circuit configuration of a unit readout circuit according to an application example 6.

FIG. 18 is a circuit diagram illustrating a circuit configuration of a unit readout circuit 13-iE according to an application example 6. The same numbering will be used in describing FIG. 18 as was utilized above in describing FIG. 3, where appropriate.

As shown in FIG. 18, the unit readout circuit 13-iE of the application example 6 has a circuit configuration including a plurality of the input side capacitors 33, for example, input side capacitors 33-1 and 33-2. Signals of the pixels in any two of m columns of the pixel array are selected by switches 62-1 and 62-2 that are on/off-controlled by switch signals φadd(1) and φadd(2), respectively. Thus, the signals are accumulated in the input side capacitors 33-1 and 33-2. Subsequently, the signal charge accumulated in the input side capacitors 33-1 and 33-2 are transferred to a feedback capacitor 36-i at the same time. In this way, two-pixel summation in the horizontal direction can be performed.

In addition, signals of two pixels in the same column of the pixel array are selected by the switches 62-1 and 62-2 in synchronization with the switch signals φadd(1) and φadd(2) and are accumulated in the input side capacitors 33-1 and 33-2, respectively. Thereafter, the signal charges accumulated in the input side capacitors 33-1 and 33-2 are transferred to the feedback capacitor 36-i at the same time. In this way, two-pixel summation in the vertical direction can be performed.

While the above description has been made with reference to two-pixel summation in the horizontal direction or the vertical direction, x-pixel summation can be performed by employing a circuit configuration including x input side capacitors 33.

Modifications

While the foregoing embodiment has been described with reference to a CMOS image sensor in which unit pixels are arranged in an array so as to detect signal charges in accordance with the intensity of visible light in the form of a physical quantity, the application of the present exemplary embodiment is not limited to CMOS image sensors. For example, the present exemplary embodiment can be applied to a variety of solid-state image sensing devices of a column type in which a column processing unit is disposed for each of the columns of a pixel array unit.

In addition, the application of the present exemplary embodiment is not limited to a solid-state image sensing device that detects the distribution of the intensity of incident visible light and captures the distribution in the form of an image. For example, the present exemplary embodiment is applicable to solid-state image sensing devices that detect the distribution of the intensity of incident infrared light, X-rays, or particles and capture the distribution in the form of an image. Alternatively, the present exemplary embodiment is widely applicable to solid-state image sensing devices (physical quantity detecting devices) that detect the distribution of a physical quantity, such as pressure or electrical capacitance, and capture the distribution in the form of an image. Examples of the physical quantity detecting devices include a fingerprint detecting device.

Furthermore, the application of the present exemplary embodiment is not limited to a solid-state image sensing device that sequentially scans the unit pixels of the pixel array on a column-by-column basis and reads out the pixel signal from the unit pixels. For example, the present exemplary embodiment is applicable to solid-state image sensing devices of an X-Y address type that select a pixel on a pixel-by-pixel basis and read out the signal from the selected pixel on a pixel-by-pixel basis.

The solid-state image sensing device may be integrated into one chip. Alternatively, the solid-state image sensing device may be a module including an image capturing unit and one of a signal processing unit and an optical system packaged therein and having an image capturing function.

Furthermore, the present exemplary embodiment is not limited to a solid-state image sensing device. For example, the present exemplary embodiment is applicable to an image pickup apparatus. As used herein, the term "image pickup apparatus" refers to an electronic device having an image capturing function, such as a camera system (e.g., a digital still camera or a digital video camera) or a cell phone. Note that the above-described module mounted in electronic devices, that is, a camera module, is also referred to as an "image pickup apparatus".

Image Pickup Apparatus

Figure 19:
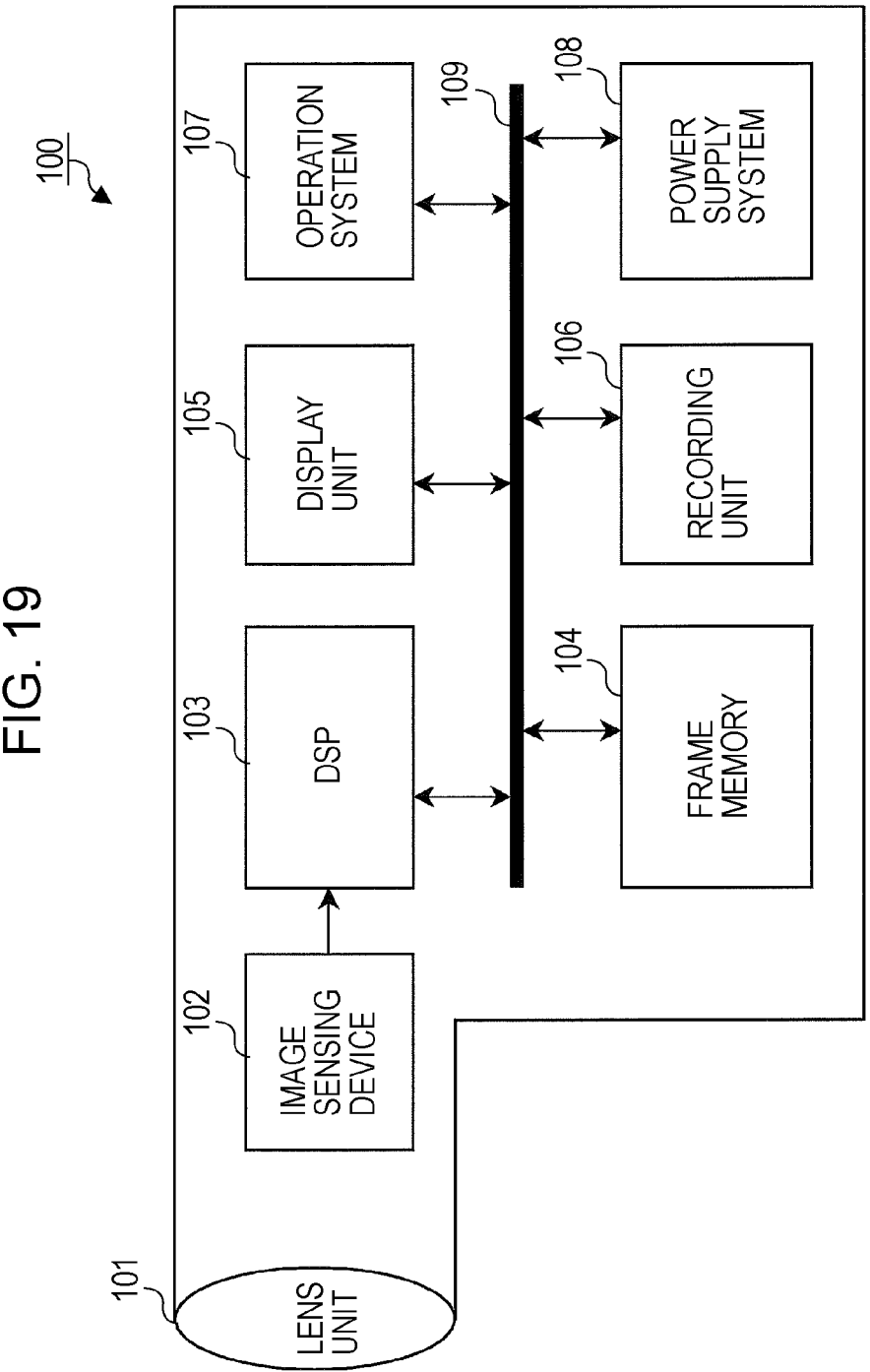
FIG. 19 is a block diagram illustrating an exemplary structure of an image pickup apparatus according to an embodiment of the present invention.
Figure 20:
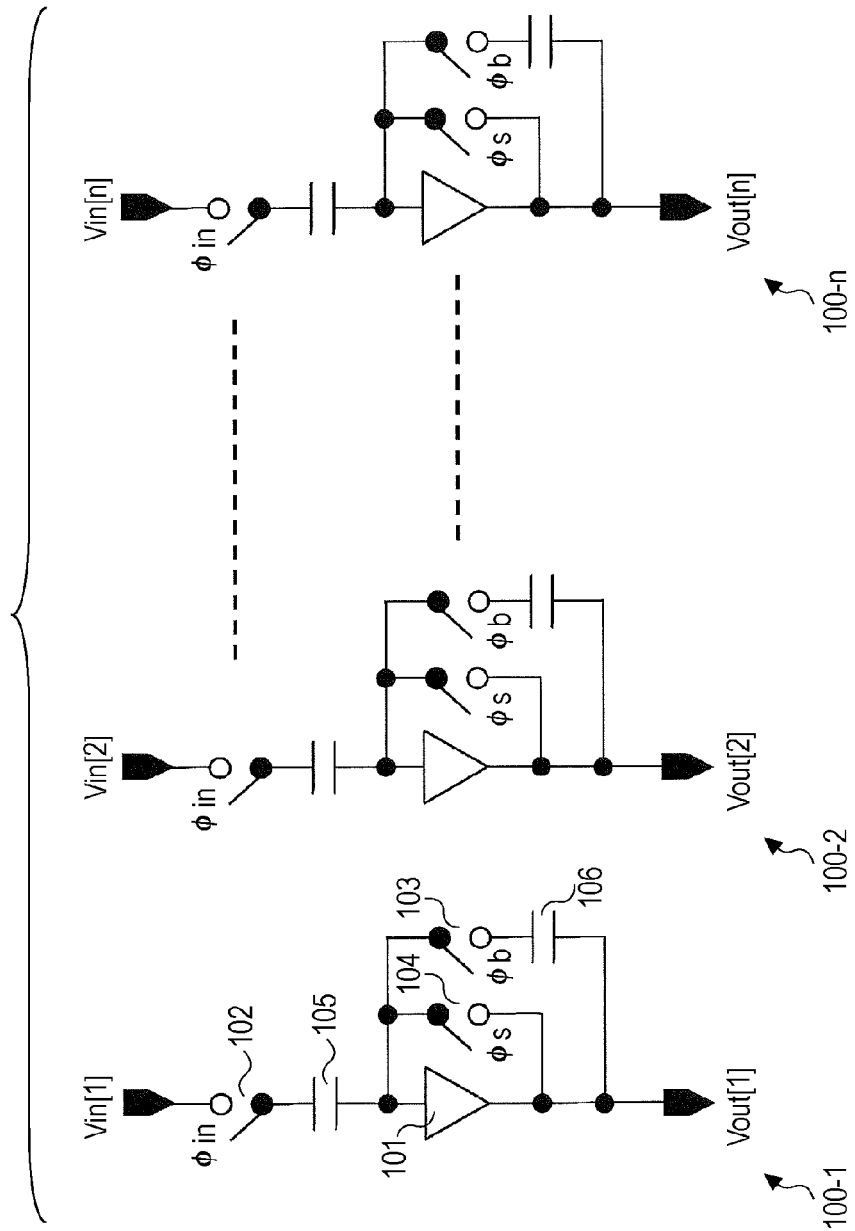
FIG. 20 is a circuit diagram illustrating the configuration of an existing signal readout circuit unit.

FIG. 19 is a block diagram illustrating an exemplary structure of an image pickup apparatus according to an embodiment of the present invention. As shown in FIG. 19, according to the embodiment of the present invention, an image pickup apparatus 100 includes an optical system including a lens unit 101, an image sensing device 102, a DSP circuit 103 serving as a camera signal processing circuit, a frame memory 104, a display unit 105, a recording unit 106, an operation system 107, and a power supply system 108. The DSP circuit 103, the frame memory 104, the display unit 105, the recording unit 106, the operation system 107, and the power supply system 108 are connected to one another via a bus line 109.

The lens unit 101 receives incident light (image light) from a subject and forms an image on an imaging plane of the image sensing device 102. The image sensing device 102 converts the intensity of the light made incident on the imaging plane thereof by the lens unit 101 into an electrical signal on a pixel-by-pixel basis. The image sensing device 102 then outputs the electrical signal as a pixel signal. One of the CMOS image sensors 10 according to the above-described embodiment and the above-described application examples is used for the image sensing device 102.

The display unit 105 includes a panel display device, such as a liquid crystal display device or an organic electroluminescence (EL) display device. The display unit 105 displays a moving image or a still image captured by the image sensing device 102. The recording unit 106 records a moving image or a still image captured by the image sensing device 102 on a recording medium, such as a video tape or a digital versatile disk (DVD).

The operation system 107 is controlled by a user and submits a variety of operation instructions regarding the functions of the image pickup apparatus. The power supply system 108 appropriately supplies electrical power to the DSP circuit 103, the frame memory 104, the display unit 105, the display unit 105, the recording unit 106, and the operation system 107 so that these units can operate.

As described above, the chip size of the CMOS image sensor 10 can be reduced since the circuit area occupied by the column processing unit can be reduced by sharing some sub-circuits of the unit readout circuit by a plurality of columns of the pixel array. Accordingly, by using one of the CMOS image sensors 10 according to the above-described embodiments and application examples for the image sensing device 102 of the image pickup apparatus 100 (e.g., a video camera, a digital still camera, or a camera module mounted in a mobile device, for example, a cell phone), the size of the image pickup apparatus 100 can be reduced.

It should be understood by those skilled in the art that various modifications, combinations, sub-combinations and alterations may occur depending on design requirements and other factors insofar as they are within the scope of the appended claims or the equivalents thereof.

What is claimed is:

1. A solid-state image sensing device comprising:
an array of pixels arranged in columns and rows, each pixel including a photoelectric converter; and
a readout circuit that includes (a) circuitry for selectively accepting signals from the columns, (b) circuitry to selectively accept a reference voltage, (c) a first capacitance positioned to receive accepted signals and the reference voltage, (d) amplification circuitry having an input positioned to receive accepted signals from the capacitance, and (e) for each column, a selectable feedback circuit to feedback, via a second capacitance, an output of the amplification circuit to the input of the amplification circuit.

2. The solid-state image sensing device of claim 1, wherein the readout circuit transfers a difference between a reset signal and the reference voltage or a difference between an accepted signal and the reference voltage to a second capacitance via the first capacitance by alternately selecting one of the columns and the reference voltage, and the readout circuit reads out a difference between an accepted signal and the reset signal for each of the columns by alternately selecting one of columns and the reference voltage so as to transfer one of the difference signals to the respective second capacitance capacitor via the input first capacitance.

3. The solid-state image sensing device of claim 2, wherein a capacitance value of the first capacitance or a respective second capacitance is variable.

4. The solid-state image sensing device of claim 3, wherein the readout circuit includes a first comparator that compares the signal level of each accepted signal output from each of the columns with a predefined value and a controller that controls the capacitance value of the first capacitance or the respective second capacitance on the basis of comparison results output from the first comparator.

5. The solid-state image sensing device according to claim 4, wherein, when the signal level of the received-light photoelectric conversion signal is higher than the predetermined value, the controller controls the capacitance value of one of the input side capacitor and the feedback capacitor so that the amplification factor determined by a ratio between the capacitance value of the input side capacitor and the capacitance value of the feedback capacitor is decreased, and wherein, when the signal level of the received-light photoelectric conversion signal is lower than the predetermined value, the controller controls the capacitance value of one of the input side capacitor and the feedback capacitor so that the amplification factor is increased.

6. The solid-state image sensing device according to claim 2, wherein the readout circuit further includes an analog-to-digital (AD) converter.

7. The solid-state image sensing device according to claim 6, wherein the AD converter is a cyclic AD converter that performs AD conversion using three values for each digit.

8. An image pickup apparatus comprising:
an array of pixels arranged in columns and rows, each pixel including a photoelectric converter;
a readout circuit that includes (a) circuitry for selectively accepting signals from the columns, (b) circuitry to selectively accept a reference voltage, (c) a first capacitance positioned to receive accepted signals and the reference voltage, (d) amplification circuitry having an input positioned to receive accepted signals from the capacitance, and (e) for each column, a selectable feedback circuit to feedback, via a second capacitance, an output of the amplification circuit to the input of the amplification circuit; and
optical system configured to form an image represented by incident light on an imaging plane of the array.

* * * * *